(12) United States Patent
Nater et al.

(10) Patent No.: US 11,321,854 B2
(45) Date of Patent: *May 3, 2022

(54) VIDEO CONTENT ACTIVITY CONTEXT AND REGIONS

(71) Applicant: Logitech Europe S.A., Lausanne (CH)

(72) Inventors: Fabian Nater, Zurich (CH); Gaurav Bradoo, San Francisco, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/090,338

(22) Filed: Nov. 5, 2020

(65) Prior Publication Data

US 2021/0133988 A1 May 6, 2021

Related U.S. Application Data

(63) Continuation of application No. 16/383,100, filed on Apr. 12, 2019, now Pat. No. 10,853,953.

(51) Int. Cl.
*G06T 7/254* (2017.01)
*G06K 9/00* (2022.01)

(52) U.S. Cl.
CPC .......... *G06T 7/254* (2017.01); *G06K 9/00201* (2013.01); *G06K 9/00718* (2013.01); *G06T 2207/10016* (2013.01); *G06T 2207/20224* (2013.01)

(58) Field of Classification Search
CPC .......... G06K 9/00771; G06K 9/00268; G06K 9/00288; G06K 9/00718; G06K 9/00885; G06K 9/00979; G06K 9/00255; G06K 9/00348; G06K 9/00657; G06K 9/00765; G06K 2009/3291; G06K 2209/15; G06K 9/6203; G06T 2207/10016; G06T 7/20; G06T 2207/10024; G06T 2207/10048; G06T 2207/20076; G06T 2207/20081; G06T 2207/30164
USPC ........................................................ 382/103
See application file for complete search history.

(56) References Cited

U.S. PATENT DOCUMENTS 10,104,343 B2 * 10/2018 Mariadoss ....... H04N 21/23418
2018/0184070 A1 * 6/2018 Nash ...................... G06T 7/593

* cited by examiner

*Primary Examiner* — Ajibola A Akinyemi
(74) *Attorney, Agent, or Firm* — Kilpatrick Townsend & Stockton LLP

(57) ABSTRACT

A method of operating a video camera system comprises recording video frames of a scene that includes a zone defined as an area within a field-of-view of the video capture element; performing a first analysis of recorded video frames showing the zone, determining, based on the first analysis, a first difference of composition thereof; performing a second analysis of an area outside of the zone; determining, based on the second analysis, a second difference of composition thereof; characterizing one or more properties corresponding to the second difference in composition; determining whether the one or more properties are associated with the first difference in composition within the zone and if so, characterizing the first difference in composition within the zone based on the one more properties and performing an action based on the characterization of the first difference in composition within the zone based on the one or more properties.

18 Claims, 9 Drawing Sheets

VIDEO CONTENT ACTIVITY CONTEXT AND REGIONS

CROSS-REFERENCES TO RELATED APPLICATIONS

This present application is a continuation of U.S. patent application Ser. No. 16/383,100, filed Apr. 12, 2019, entitled "VIDEO CONTENT ACTIVITY CONTEXT AND REGIONS," which is herein incorporated by reference in its entirety for all purposes.

BACKGROUND

Unless otherwise indicated herein, the materials described in this section are not prior art to the claims in this application and are not admitted to be prior art by inclusion in this section.

Conventional video camera systems communicate with computers. Software running on the computer provides a user with various functionality related to the video images communicated from the video camera to the computer. For example, the computer can process video images captured by the camera to determine whether motion occurs within the recorded video images captured by the video camera. In some cases, more detailed information regarding specific regions, or zones, with in a scene monitored by a video camera system may be desired by a user. For example, a user may wish to determine whether a package has been delivered.

One way to determine whether a package has been delivered is to use a video camera system with an object detector to detect the package. Running an object detector, however, may not solve the problem of detecting a package due to the large number of different form factors of objects to detect. Thus, an object detector may provide only a limited solution to the problem of package detection.

SUMMARY

Systems and methods for detecting objects added or removed within defined regions of a scene monitored by a video camera are provided. In some embodiments, a video camera comprises a video capture element configured to capture video images; an electronic media storage device; and a processor coupled with the video capture element and the electronic media storage device, the processor configured to: record, in the electronic media storage device, video images of a scene captured by the video capture element; perform a motion analysis of the recorded video that identifies a cause of a detected motion within at least a portion of a defined zone within the scene; perform a static analysis of a first static video frame showing the defined zone at a first point in time and a second static video frame showing the defined zone at a second point in time; and determine that an object was added to or removed from the defined zone based on characteristics of the cause of the detected motion identified by the motion analysis and a difference in composition between the first static video frame and the second static video frame identified by the static analysis. The processor can be further configured to track the cause of the detected motion within the scene. In some aspects, the processor can be configured to identify the cause of the detected motion based on results from a classifier trained with relevant data to identify a class of the cause of the detected motion. The classifier can identify the cause of the detected motion as a person, the processor determines that the object added to or removed from the defined zone is a package.

In some implementations, the defined zone can be a car parking zone, the classifier may identify the cause of the detected motion as a car, and the processor may determine that the car arrived in or departed from the car parking zone. The processor may receive user input to create the defined zone. The defined zone may be defined by the processor based on an analysis of the scene. In some aspects, the static analysis can be performed by the processor, which may include: comparing raw pixel values of the first static video frame and the second static video frame, determining statistics of pixels over the first static video frame and the second static video frame, or comparing edges or image features of the first static video frame and the second static video frame. The processor can be further configured to determine that the object was added to the defined zone when the static analysis of the first static video frame and the second static video frame indicates a dissimilarity between changed pixels in an area of the defined zone and surrounding pixels of the area. The processor can be further configured to determine that the object was removed from the defined zone when the static analysis of the first static video frame and the second static video frame indicates a similarity between changed pixels in an area of the defined zone and surrounding pixels of the area.

In certain embodiments, a video camera system comprises: a video capture element configured to capture video images; an electronic media storage device; and one or more processors coupled to the video capture element and the electronic media storage device, the one or more processors configured to: record, using the electronic media storage device, video frames of a scene captured by the video capture element, wherein the scene includes a zone defined as an area within a field-of-view of the video capture element; perform a first analysis of a first set of the recorded video frames showing the zone over a first period of time and a second set of the recorded video frames showing the zone over a second period of time; determine, based on the first analysis, a first difference of composition between the first set of video frames and the second set of video frames within the zone; perform a second analysis of a third set of the recorded video frames showing an area outside of the zone over a third period of time and a fourth set of the recorded video frames showing the area outside of the zone over a fourth period of time; determine, based on the second analysis, a second difference of composition between the third set of video frames and the fourth set of video frames; characterize one or more properties corresponding to the second difference in composition outside of the zone; determine whether the one or more properties are associated with the first difference in composition within the zone; and in response to determining that the one or more properties are associated with the first difference in composition within the zone, the one or more processors are configured to: characterize the first difference in composition within the zone based on the one more properties; and perform an action based on the characterization of the first difference in composition within the zone.

In further embodiments, the second analysis of the third set and fourth set of the recorded video frames can be performed in response to determining that there is a difference in composition between the first set of video frames and the second set of video frames within the zone. The first and second sets of video frames each can have a single video frame, wherein the first analysis is a static analysis of the first and second sets of video frames, and wherein the difference in composition between the first and second sets of video frames in the first analysis corresponds to a detected object being present in the first set of video frames and the detected object not being present in the second set of video frames. In some cases, the second analysis may be a motion-based analysis of an object detected in the third set of video frames. The one or more properties of the object can include at least one of: a size of the object; a shape of the object; a color of the object; a location of the object; a classification of the object; alphanumeric text associated with the object; movement traits of the object, or the like, as would be appreciated by one of ordinary skill in the art with the benefit of this disclosure. The action performed may include at least of: alert a user of the difference in composition between the first and second sets of video frames; send a corresponding video clip including the difference in composition between the first and second sets of video frames; trigger an alarm; open or unlock a door; turn on a remote video camera; trigger a launch of a security drone, or the like, as would be appreciated by one of ordinary skill in the art with the benefit of this disclosure. In some cases the the difference in composition between the first and second sets of video frames may correspond to a change in the content of pixels defining the first and second sets of video frames. In some aspects, the one or more processors are further configured to detect a motion of an object within the third or fourth sets of recorded video frames, wherein determining whether the one or more properties are associated with the difference in composition between the first set of video frames and the second set of video frames may include determining whether the detected motion of the object includes a movement of the detected object within the zone.

In some embodiments, a method of operating a video camera system may comprise: recording, using a video capture element and an electronic media storage device controlled by one or more processors, video frames of a scene captured by the video capture element, wherein the scene includes a zone defined as an area within a field-of-view of the video capture element; performing, by the one or more processors, a first analysis of a first set of the recorded video frames showing the zone over a first period of time and a second set of the recorded video frames showing the zone over a second period of time; determining by the one or more processors, based on the first analysis, a first difference of composition between the first set of video frames and the second set of video frames within the zone; performing, by the one or more processors, a second analysis of a third set of the recorded video frames showing an area outside of the zone over a third period of time and a fourth set of the recorded video frames showing the area outside of the zone over a fourth period of time; determining by the one or more processors, based on the second analysis, a second difference of composition between the third set of video frames and the fourth set of video frames; characterizing, by the one or more processors, one or more properties corresponding to the second difference in composition outside of the zone; determining, by the one or more processors, whether the one or more properties are associated with the first difference in composition within the zone; and in response to determining that the one or more properties are associated with the first difference in composition within the zone, the one or more processors are configured to perform: characterizing the first difference in composition within the zone based on the one more properties; and performing an action based on the characterization of the first difference in composition within the zone. In some cases, the second analysis of the third set and fourth set of the recorded video frames is performed in response to determining that there is a difference in composition between the first set of video frames and the second set of video frames within the zone.

In certain embodiments, the first and second sets of video frames each have a single video frame, wherein the first analysis is a static analysis of the first and second sets of video frames, and wherein the difference in composition between the first and second sets of video frames in the first analysis corresponds to a detected object being present in the first set of video frames and the detected object not being present in the second set of video frames. The second analysis can be a motion-based analysis of the object detected in the third set of video frames. In certain embodiments, the one or more properties of the object include at least one of: a size of the object; a shape of the object; a color of the object; a location of the object; a classification of the object; alphanumeric text associated with the object; or movement traits of the object. In some cases, the action performed includes at least of: alerting a user of the difference in composition between the first and second sets of video frames; sending a corresponding video clip including the difference in composition between the first and second sets of video frames; triggering an alarm; opening or unlocking a door; turning on a remote video camera; triggering a launch of a security drone, or the like, as would be appreciated by one of ordinary skill in the art with the benefit of this disclosure. In some aspects, the difference in composition between the first and second sets of video frames may correspond to a change in the content of pixels defining the first and second sets of video frames. The one or more processors can be further configured to perform: detecting a motion of the object within the third or fourth sets of recorded video frames, wherein determining whether the one or more properties are associated with the difference in composition between the first set of video frames and the second set of video frames includes determining whether the detected motion of the object includes a movement of the object within the zone.

In further embodiments, a non-transitory computer-program product tangibly embodied in a machine-readable non-transitory storage medium can include instructions configured to cause one or more processors to: record, using a video capture element and an electronic media storage device, video frames of a scene captured by the video capture element, wherein the scene includes a zone defined as an area within a field-of-view of the video capture element; perform a first analysis of a first set of the recorded video frames showing the zone over a first period of time and a second set of the recorded video frames showing the zone over a second period of time; determine, based on the first analysis, a first difference of composition between the first set of video frames and the second set of video frames within the zone; perform a second analysis of a third set of the recorded video frames showing an area outside of the zone over a third period of time and a fourth set of the recorded video frames showing the area outside of the zone over a fourth period of time; determine, based on the second analysis, a second difference of composition between the third set of video frames and the fourth set of video frames; characterize one or more properties corresponding to the second difference in composition outside of the zone; determine whether the one or more properties are associated with the first difference in composition within the zone; and in response to determining that the one or more properties are associated with the first difference in composition within the zone, the one or more processors are configured to: characterize the first difference in composition within the zone based on the one more properties; and perform an action based on the characterization of the first difference in composition within the zone. In some cases, the second analysis of the third set and fourth set of the recorded video frames is performed in response to determining that there is a difference in composition between the first set of video frames and the second set of video frames within the zone. In some aspects, the first and second sets of video frames each have a single video frame, wherein the first analysis is a static analysis of the first and second sets of video frames, and wherein the difference in composition between the first and second sets of video frames in the first analysis corresponds to a detected object being present in the first set of video frames and the detected object not being present in the second set of video frames. In some embodiments, the second analysis is a motion-based analysis of the object detected in the third set of video frames.

In certain embodiments, the one or more properties of the object include at least one of: a size of the object; a shape of the object; a color of the object; a location of the object; a classification of the object; alphanumeric text associated with the object; movement traits of the object, or the like, as would be appreciated by one of ordinary skill in the art with the benefit of this disclosure. In some aspects, the action(s) performed can include at least one of: alert a user of the difference in composition between the first and second sets of video frames; send a corresponding video clip including the difference in composition between the first and second sets of video frames; trigger an alarm; open or unlock a door; turn on a remote video camera; trigger a launch of a security drone, or the like, as would be appreciated by one of ordinary skill in the art with the benefit of this disclosure. In some cases, the difference in composition between the first and second sets of video frames can correspond to a change in the content of pixels defining the first and second sets of video frames. The one or more processors can be further configured to detect a motion of the object within the third or fourth sets of recorded video frames, wherein determining whether the one or more properties are associated with the difference in composition between the first set of video frames and the second set of video frames includes determining whether the detected motion of the object includes a movement of the object within the zone.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses and systems described herein may be embodied in a variety of other forms. Furthermore, various omissions, substitutions, and changes in the form of the example methods and systems described herein may be made without departing from the scope of protection.

Various aspects of the present disclosure may provide systems and methods for detecting objects added or removed within defined regions of a scene monitored by a video camera. Video camera systems are in use for premises monitoring for homes and businesses to capture events that occur in and around the premises. A video camera in a video camera system may monitor a scene such as an entry way, a room, a parking lot, etc. The scene monitored by the video camera will typically include various static features, for example, but not limited to, doors, windows, furniture, etc. One of ordinary skill in the art will appreciate that this is not an exhaustive list and that many other types of features may be included in a scene monitored by the video camera.

The video camera system may analyze the video, for example perform a motion analysis, to determine areas within the scene where motion occurs. For example, the video camera system may analyze the video using a motion detection algorithm to identify motion in the scene and identify the areas where the motion is detected and may timestamp points in the video when the motion is detected.

In some cases, all of the motion events captured by the video camera system may not be of interest to a user. Rather, the user may only be interested in detected motion events within defined regions, or zones, of an overall scene monitored by the video camera system. Even then, not all motion events inside the defined zone may be of interest, only motion events that fit certain criteria. Various embodiments of the present disclosure may enable a user to define zones of interest, filter motion within the defined zones based on specific criteria, and use the defined zones or regions together with information extracted from the captured video to detect particular events.

Figure 3:
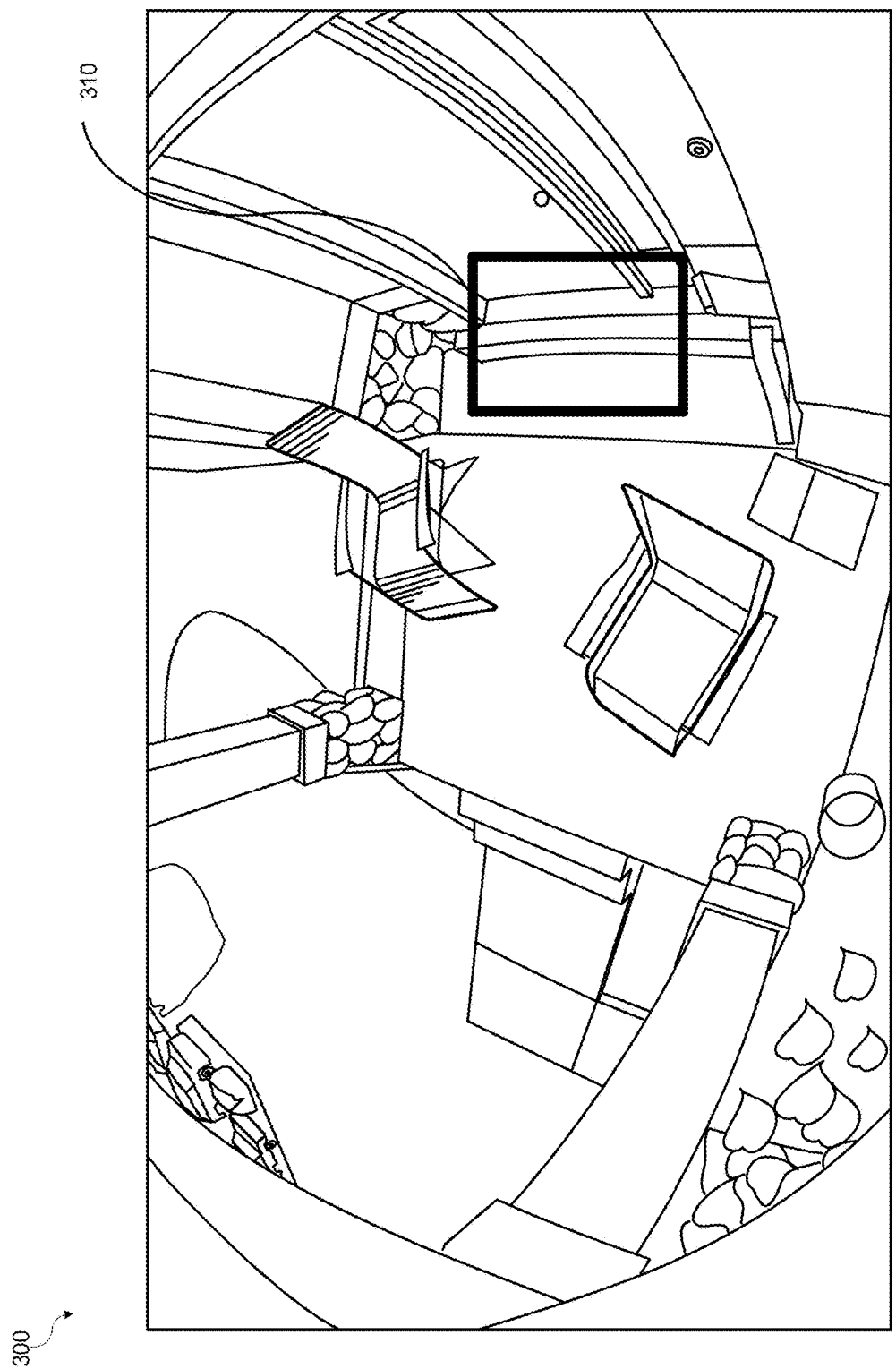
FIG. 3 is an illustration representing a scene monitored by a video camera in accordance with various aspects of the present disclosure.

FIG. 3 shows an entryway of a house with a zone defined to detect delivery of a package. FIG. 4 shows a delivery person creating motion in the zone and leaving a package within the zone. According to various aspects of the present disclosure, the motion in the defined zone created by the delivery person may initiate a static analysis of one or more video frames before the motion was detected and one or more video frames after the motion is no longer detected. A difference in the composition of the defined zone in the static video frames before and after the detected motion may indicate that a package was delivered.

Figure 1:
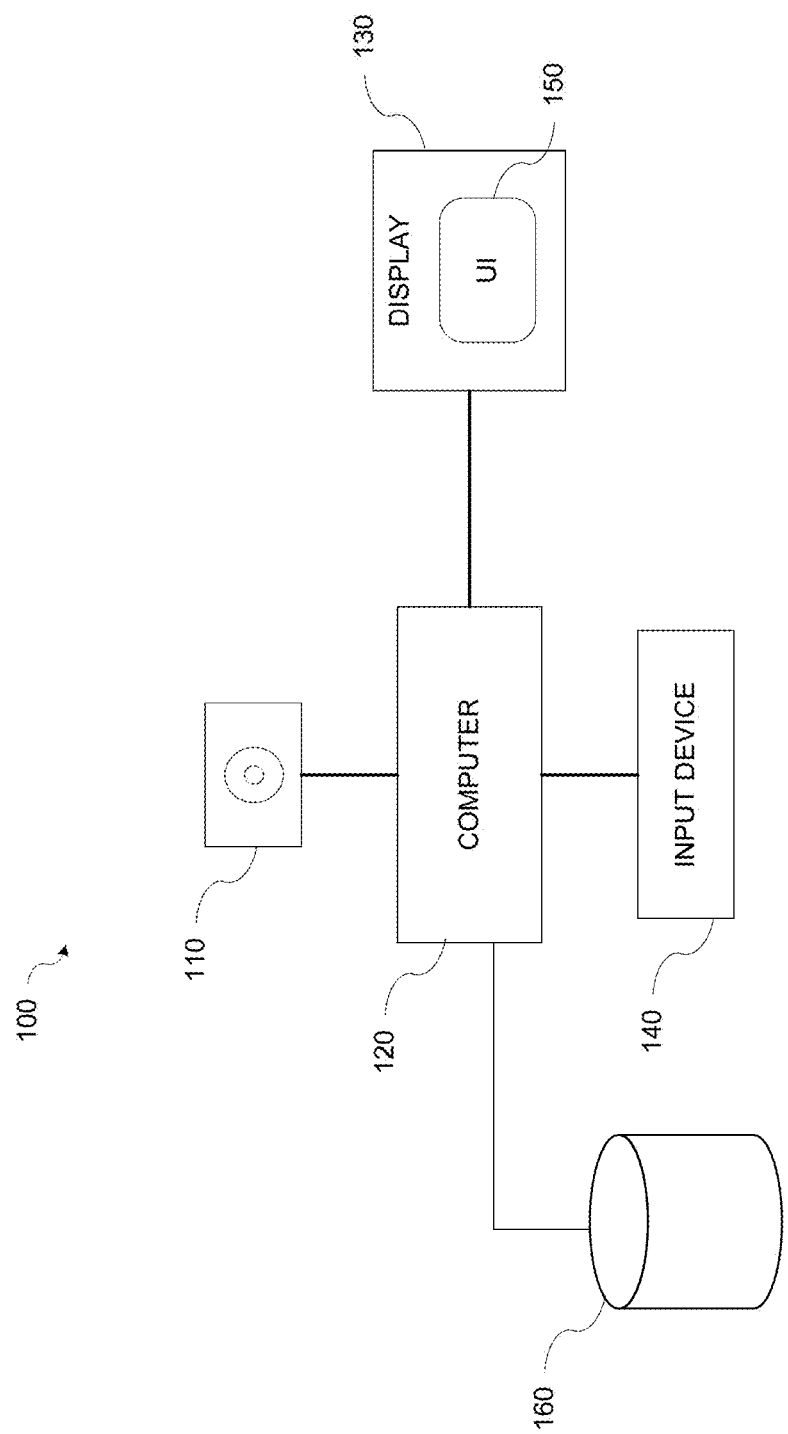
FIG. 1 is a block diagram of a video camera system in accordance with various aspects of the present disclosure.

FIG. 1 is a block diagram of a video camera system 100 in accordance with various aspects of the present disclosure. Referring to FIG. 1, the video camera system 100 may include a video camera 110, a computer 120, a display device 130, an input device 140, and a storage device 160. The computer 120 may be, for example but not limited to, a computer, processor, microprocessor, controller, microcontroller, server, etc., and may communicate with the video camera 110 to receive video images. The computer 120 may also communicate with the external storage device 160 to store video data, for example, frames of video and other data, of the video captured by the video camera 110 as well as video data processed by the computer 120. The storage device 160 may be, for example but not limited to, a hard disk drive, a solid-state drive, or other storage capable of storing the recorded video data.

The video camera 110 may include a processor 112, an internal electronic media storage device 114, and a video capture element 116. The processor 112 may be a microprocessor, controller, microcontroller, or other programmable controller device. The internal electronic media storage device 114 may be a solid state memory device known to those of skill in the art. Portions of the internal electronic media storage device 114 may provide nonvolatile storage for recorded video as well as one or more buffers for temporary storage of recorded video. The video capture element 116 may be a charge-coupled device (CCD) or other imaging device. The processor 112 may communicate with the internal electronic media storage device 114 and the video capture element 116 element to record video images.

In some implementations, motion analysis and static analysis of video captured by the video camera 110 may be performed by the processor 112 of the video camera 110. In some implementations, the analysis may be performed by the computer 120 of the video camera system 100. In other implementations, the analysis may be performed by both the processor 112 of the video camera 110 and the computer 120 of the video camera system 100 based on the capabilities of each. In some implementations, at least a portion of the analysis may be performed in the cloud.

The computer 120 may also communicate with the display device 130 to render the video images received from the video camera 110 and display a user interface 150. The user interface 150 may include a graphical editor that enables a user to interact with the video images via the input device 140. In accordance with various aspects of the present disclosure, the user interface 150 may be a web application. The input device 140 may be for example but not limited to a keyboard and/or mouse. One of ordinary skill in the art will appreciate that other input devices may be used without departing from the scope of the present disclosure.

The video camera 110 may be set to record video of a scene of interest to a user. For example, the user may wish to monitor an entry way of a building, for example, a house or place of business. The video camera 110 may focus on a scene that includes the entry way as well as portions of the area surrounding the entry way. In accordance with various aspects of the present disclosure, the video camera 110 may be fixed on a scene. Alternatively, the video camera 110 may move (e.g., pan, tilt, zoom). In such cases where the video camera 110 moves, the relative position of the video camera 110 may be tracked and the movement correlated to the features of the scene. In cases of uncontrolled or unintentional camera movement (e.g., camera tampering, faulty mounting, etc.), the computer 120 of the video camera 110 may determine based on previously recorded video whether the field of view of the video camera 110 has changed. The computer 120 of the video camera 110 may detect and compensate for the uncontrolled or unintentional camera movement. The computer 120 of the video camera 110 may cause all or a portion of the video data of the recorded video to be stored in the storage device 160.

In some implementations, the video camera system 100 may include a doorbell camera, for example, a wide angle doorbell camera capable of monitoring a wide area, for example, a substantial portion of entryway. In some implementations the video camera system 100 may include a plurality of video cameras that may be aware of each other. In some cases, the plurality of video cameras may continually monitor the scene. In other cases, some cameras of the plurality of video cameras may be activated only on occurrence of an event, for example, detection of motion in the scene. In accordance with various aspects of the present disclosure, the video camera system 100 may identify various static features included in a scene monitored by the video camera 110. The identified features may be used during static analysis.

In some implementations, the computer 120 and/or the processor 112 of the video camera 110 may analyze a recorded video of a monitored space and provide recommendations to the user of areas, or zones, within the space in which motion events may be detected, the level of motion within the zones (e.g., whether a high or low number of motion events may be expected), and whether to be notified of the motion events or ignore the motion events in the zones. Further disclosure with respect to computer generated zone recommendations can be found in U.S. patent application Ser. No. 15/992,234, filed May 30, 2018, the disclosure of which is incorporated herein by reference for all purposes.

In some implementations, regions, or zones, within a monitored scene may be defined to determine whether an object has been added or removed from the zone. The defined zones may provide a focus area within the overall scene where relevant motion may occur that should be detected. The zones may be user defined in addition or alternative to computer defined zones. A user may operate the input device 140 to define a zone on the user interface 150 within a scene displayed on the display device 130. Alternatively, the computer 120 and/or the processor 112 of the video camera 110 may perform a static analysis of the monitored scene and indicate defined zone. One of ordinary skill in the art will appreciate that any applicable technique known in the art appropriate for interacting with the user interface 150 to resize, reposition, delete, or otherwise modify the graphical representation of a defined zone may be used without departing from the scope of the present disclosure.

The computer 120 and/or the processor 112 of the video camera 110 may cause the user interface 150 to present graphical representation of one or more defined zones in the scene on the user display device 130. Various zones, for example, but not limited to, package delivery zones, car parking zones, door or window zones (e.g., to detect open/closed), a zone to monitor a child in a crib, check-out and return zones for rental equipment, etc., may be defined. In addition, the video camera system 100 may calculate statistics on zone utilization, for example, frequency with which an object is added to and/or removed from a defined zone.

Figure 2:
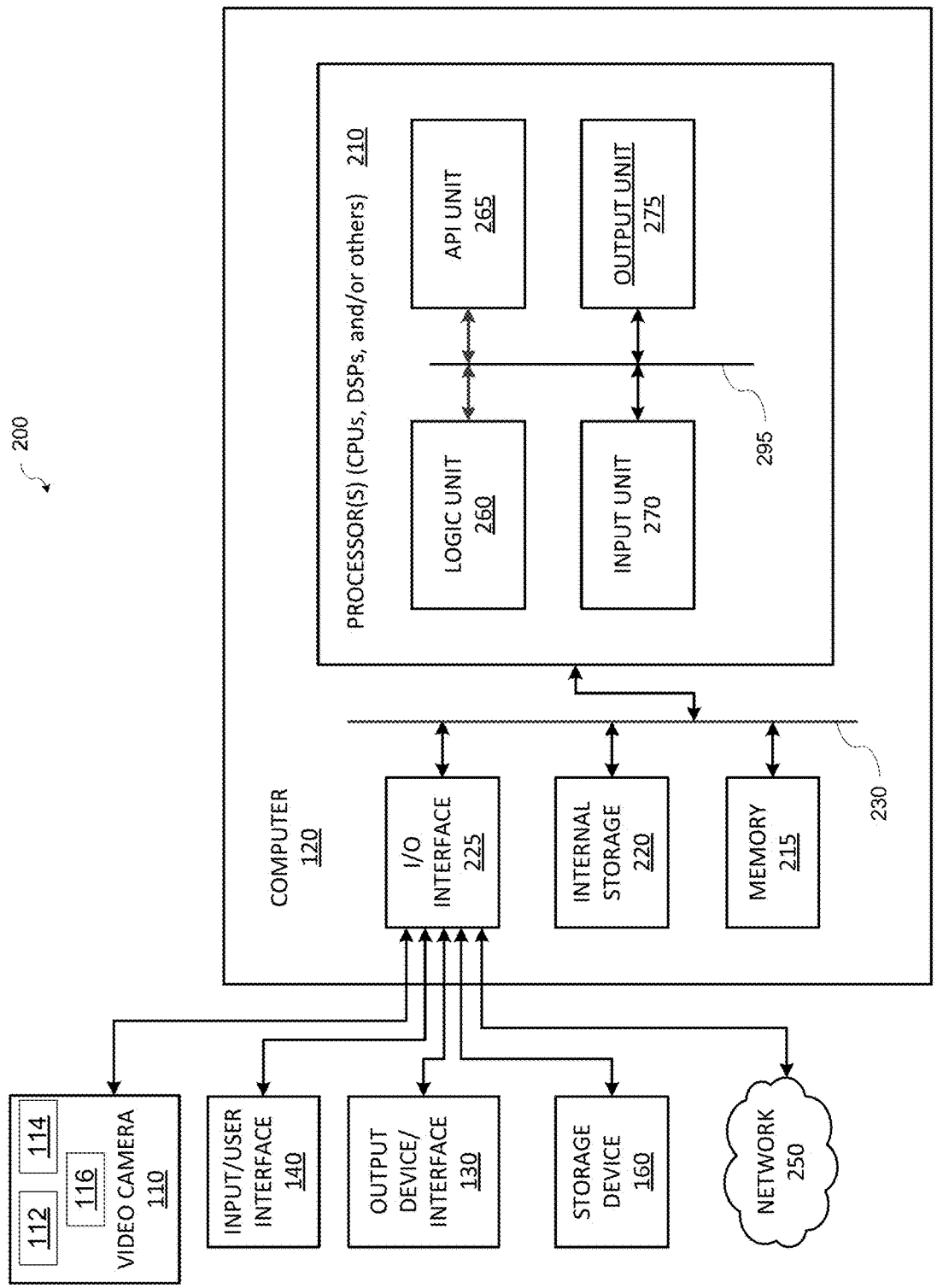
FIG. 2 is a block diagram illustrating an example computing environment 200 with an example computer 120 suitable for use in some example implementations.

FIG. 2 is a block diagram illustrating an example computing environment 200 with an example computer 120 suitable for use in some example implementations. Computer 120 in the computing environment 200 may include one or more processing units, cores, or processors 210, memory 215 (e.g., RAM, ROM, and/or the like), internal storage 220 (e.g., magnetic, optical, solid state storage, and/or organic), and/or I/O interface 225, any of which can be coupled on a communication mechanism or bus 230 for communicating information or embedded in the computer 120.

Computer 120 may be communicatively coupled to the video camera 110, the input device 140 and output device 130. Either one or both of the input device 140 and output device 130 may be a wired or wireless interface and may be detachable. The input device 140 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). The output device 130 may include a display, television, monitor, or the like. In some example implementations, the input device 140 and output device 130 may be embedded with or physically coupled to the computer 120. In other example implementations, other computing devices may function as or provide the functions of input device 140 and output device 130 for the computer 120.

Examples of the computer 120 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility, for example, but not limited to, desktop computers, other computers, televisions with one or more processors embedded therein and/or coupled thereto, and the like).

The computer 120 may be communicatively coupled (e.g., via I/O interface 225) to the storage device 160 and the network 250 for communicating with any number of networked components, devices, and systems, including one or more computing devices of the same or different configuration. The computer 120 or any connected computing device can be functioning as, providing services of, or referred to as a server, client, thin server, general machine, special-purpose machine, or another label.

The I/O interface 225 may include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 200. The network 250 may be any network or combination of networks (e.g., the Internet, local area network, wide area network, a telephonic network, a cellular network, satellite network, and the like).

The computer 120 may use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The computer 120 may be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages, for example, but not limited to, C, C++, C #, Java, Visual Basic, Python, Perl, JavaScript, and others.

Processor(s) 210 of the computer 120 may execute under any operating system (OS) (not shown), in a native or virtual environment. One or more applications can be deployed that include the logic unit 260, the application programming interface (API) unit 265, the input unit 270, the output unit 275, and the inter-unit communication mechanism 295 for the different units to communicate with each other, with the OS, and with other applications (not shown). The units and elements can be varied in design, function, configuration, or implementation and are not limited to the descriptions provided.

FIG. 3 is an illustration representing a scene monitored by a video camera in accordance with various aspects of the present disclosure. Referring to FIG. 3, the scene 300 monitored by the video camera 110 may be an entryway of a house. A defined zone 310 is illustrated at a doorway to the house. The zone 310 may be a computer defined zone or a user defined zone. For example, a user may operate the input device 140 of the video camera system 100 to define the zone 310 on the user interface 150 within the scene 300 displayed on the display device 130. Alternatively, the computer 120 may perform static analysis and/or motion analysis of the scene and, based on the analysis, generate a defined zone in which an object is likely to be added or removed. The defined zone 310 may be a package delivery zone. One of ordinary skill in the art will appreciate that other zones of different sizes may be defined. A defined zone may be sized appropriately to detect an object that a user expects to be added or removed from the zone. For example, a zone configured to detect whether a car arrived or departed from a particular location may be larger than a zone configured to determine if a package has been left at or removed from an entry way.

In accordance with various aspects of the present disclosure, the video camera system 100 may detect motion in the monitored scene 300. For example, a sensor (e.g., an infrared sensor or other sensor) in the video camera 110 may detect motion in the monitored scene and cause the video camera 110 to record motion video. In some embodiments, movement may be detected by various devices or sensors configured to detect motion. The computer 120 and/or the processor 112 of the video camera 110 may be coupled to the one or more devices or sensors, for example but not limited to, an ultrasonic rangefinder/imager, an infrared (IR) detector, a trip laser, etc., and receive motion detection signals from the one or more devices or sensors. One of ordinary skill in the art will appreciate that other devices or sensors may be used without departing from the scope of the present disclosure. The video camera 110 may buffer (e.g., temporarily store) recorded video until a motion detection signal is received. Upon receiving the motion detection signal, the computer 120 may cause the video camera 110 to record and store the recorded video.

Using motion estimation techniques, for example, but not limited to, foreground differentiation, optical flow, etc., motion detected within the monitored scene 300 may be analyzed by the computer 120 and/or the processor 112 of the video camera 110 to determine whether the motion occurs within or overlaps with at least a portion of the defined zone 310. When motion detected within the monitored scene 300 overlaps with at least a portion of the defined zone 310, static analysis of video frames captured before and after the motion may be initiated. Based on timestamps indicating a period of time that the motion video frames were recorded, one or multiple static video frames surrounding the motion video frames may be analyzed to determine whether an object has been added or removed from a defined zone 310.

The video camera 110 may buffer motion video frames for a predetermined amount of time, for example, five seconds or another time period to permit selection of video frames from the buffered motion video for static analysis to be performed by the computer 120 and/or the processor 112 of the video camera 110. The computer 120 may select one or multiple static video frames from the video frames captured by the video camera 110 before the motion is detected in the defined zone 310 and one or multiple static video frames from the video frames captured by the video camera 110 after the motion detected in the defined zone 310 has ended for static analysis. The motion detected in the defined zone 310 may be motion within the scene that overlaps a boundary of the defined zone 310 or motion completely in the defined zone 310. The video may be timestamped and the timestamps may be used to determine the beginning and the end of the motion video for selecting the static video frames.

Buffered video recorded prior to motion detection may be referred to herein as "pre-roll video" and video recorded after detected motion has ended may be referred to herein as "post-roll video." The selected one or multiple static video frames from the video frames captured by the video camera 110 before the motion is detected in the identified zone may be referred to herein as the "pre-roll static video frames" and the one or multiple static video frames from the video frames captured by the video camera 110 after the motion detected in the identified zone has ended may be referred to herein as the "post-roll static video frames."

The video camera system 100 may analyze the selected static video frames, for example perform a static scene analysis, to identify various static objects in the scene. For example, the computer 120 and/or the processor 112 of the video camera 110 may analyze the selected static video frames and perform video recognition of the various objects furniture, doorways, etc. The static analysis of the pre-roll static video frames and the post-roll static video frames may include, for example, but not limited to, comparing raw pixel values of the frames, determining statistics of pixels over some or all of the frames, analyzing edges or other image features related to the frames, etc. Changes in light levels, pets sitting in the identified zone, etc., may also be detected. One of ordinary skill in the art will appreciate that other techniques for performing video recognition of the various objects in the pre-roll static video frames and the post-roll static video frames may be used without departing from the scope of the present disclosure.

Based on the detected motion and the analysis of the pre-roll static video frames and the post-roll static video frames, the video camera system 100 may determine whether an object was added or removed from the defined zone 310. For example, when the static analysis is performed to compare the pre-roll static video frames and the post-roll static video frames, detection that an object has been removed may be achieved at least in part based on the similarity between changed pixels in an area of the defined zone 310 of a static frame and surrounding pixels of the changed area. Conversely, a dissimilarity between changed pixels an area of a static frame and surrounding pixels of the change may detect that an object has been added. In some cases, objectness (e.g., an element having defined boundaries and a different appearance from the immediate surroundings) of the static change or classification of an object, for example a car, detected as a change in the composition of the defined zone between the pre-roll static video frames and the post-roll static video frames may be performed.

A change in composition may be determined as changes in raw pixel values of the frames, different statistics of pixels over some or all of the frames, different edges or other descriptors, for example, but not limited to, edges, histograms of gradients, or other image features related to the frames, etc. In some implementations, changes in depth imaging information, for example using an input sensor operable to sense depth of the pixels, may be determined. One of ordinary skill in the art will appreciate that other methods of determining a change in composition of the defined zone may be used without departing from the scope of the present disclosure.

Since objects should not move on their own, an assumption may be made that a person is involved in the addition or removal of an object from a defined zone. For example, a package is delivered by a person. The computer 120 may cause person detection to be performed on motion regions that overlap with defined zones. Person detection may be performed by an algorithm operating on the computer 120. Person detection may also detect a person moving towards the defined zone, a person in a vicinity of the defined zone, and/or a person moving away from the defined zone. Therefore, static changes in the composition of the defined zone in the static video frames without the influence of a person involved in the addition/removal of an object may be eliminated. Thus, without explicitly detecting a package (or absence thereof) the video camera system 100 may determine that an object was added or removed from the defined zone 310 by detecting a static change in the composition of the defined zone 310 before and after motion created by a person was detected.

Figure 4A:
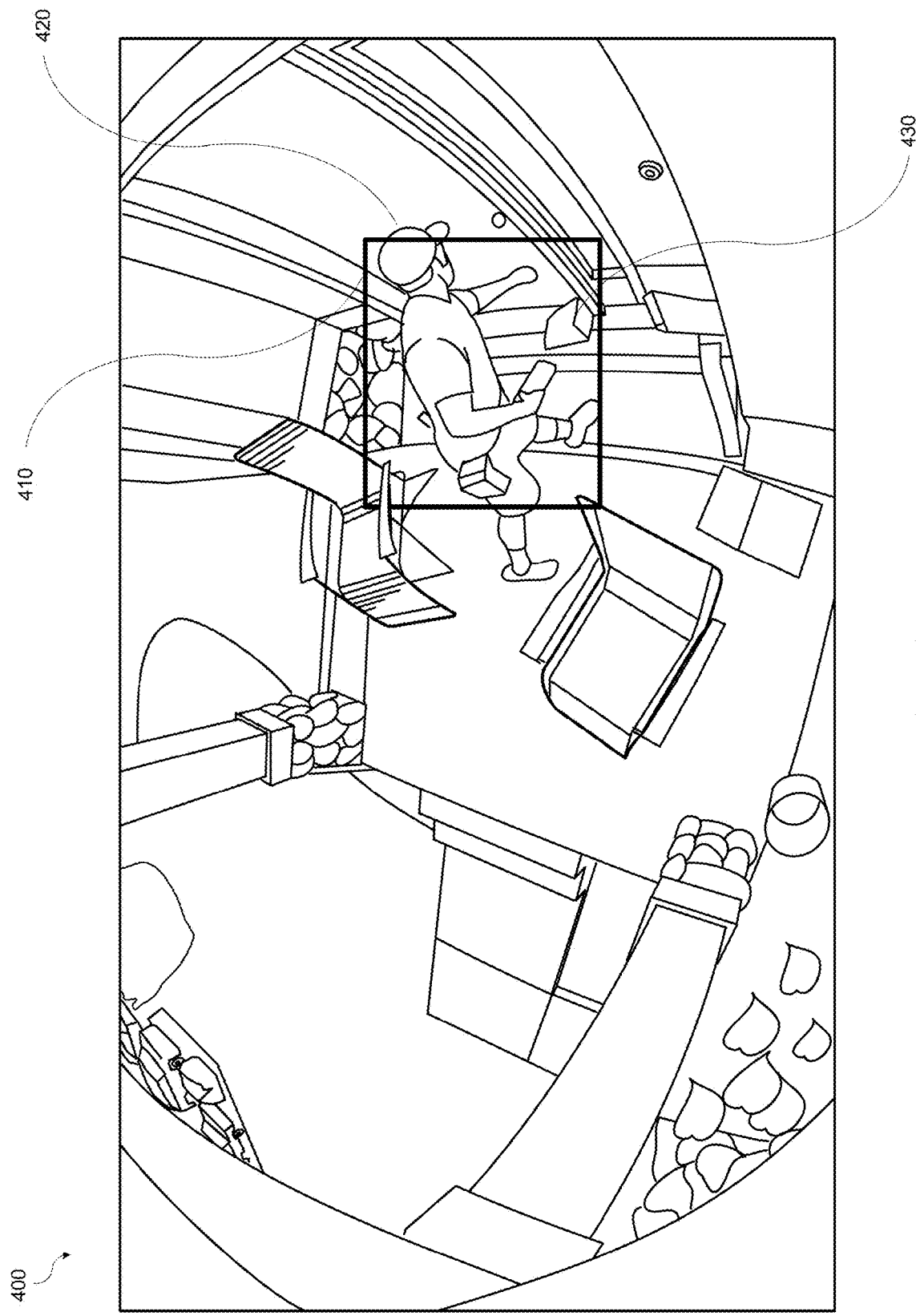
FIG. 4A is an illustration of a zone in a scene in which motion may be detected in accordance with various aspects of the present disclosure.

FIG. 4A is an illustration of a zone in a scene 400 in which motion may be detected in accordance with various aspects of the present disclosure. Referring to FIG. 4A, the scene 400 monitored by the video camera 110 may be an entryway of a house. A defined zone 410 is illustrated at a doorway to the house. The defined zone 410 may be a computer defined zone or a user defined zone. For example, a user may operate the input device 140 of the video camera system 100 to define the zone 410 on the user interface 150 within the scene 400 displayed on the display device 130. Alternatively, the computer may perform static analysis and/or motion analysis of the scene 400 and, based on the analysis, generate a defined zone in which an object is likely to be added or removed. The defined zone 410 may be a package delivery zone.

When motion occurs within the scene 400, the video camera system 100 may detect the motion, for example, the arrival of a delivery person 420, and the video camera 110 may capture and timestamp the motion video. The video camera system 100 may track the entity creating the motion. In accordance with various aspects of the present disclosure, motion within the defined zone 410 may be detected by measuring overlap of a tracked entity with the defined zone 410. For example, a person (e.g., a tracked entity) may enter a scene monitored by the video camera 110, and the computer 120 and/or the processor 112 of the video camera 110 may detect the motion captured by the video camera 110 created by the tracked entity. The computer 120 and/or the processor 112 of the video camera 110 may determine whether the detected motion in the scene 400 overlaps with the defined zone 410 within the scene 400. For example, the computer 120 and/or the processor 112 of the video camera 110 may determine whether a number of pixels associates with the tracked entity overlaps a boundary of the defined zone 410.

The computer 120 and/or the processor 112 of the video camera 110 may perform a motion analysis of the captured motion video and a static analysis of the pre-roll static video frames and the post-roll static video frames to compare the composition of the defined zone 410 before the motion was detected to the composition of the defined zone 410 after the detected motion ends. For example, the computer 120 and/or the processor 112 of the video camera 110 may select one or a plurality of static video frames from the pre-roll static video frames and the post-roll static video frames and may compare raw pixel values or other descriptors, for example, but not limited to, edges, histograms of gradients, etc. One of ordinary skill in the art will appreciate that other descriptors and/or features describing the composition of the zones may be used without departing from the scope of the present disclosure.

Figure 4B:
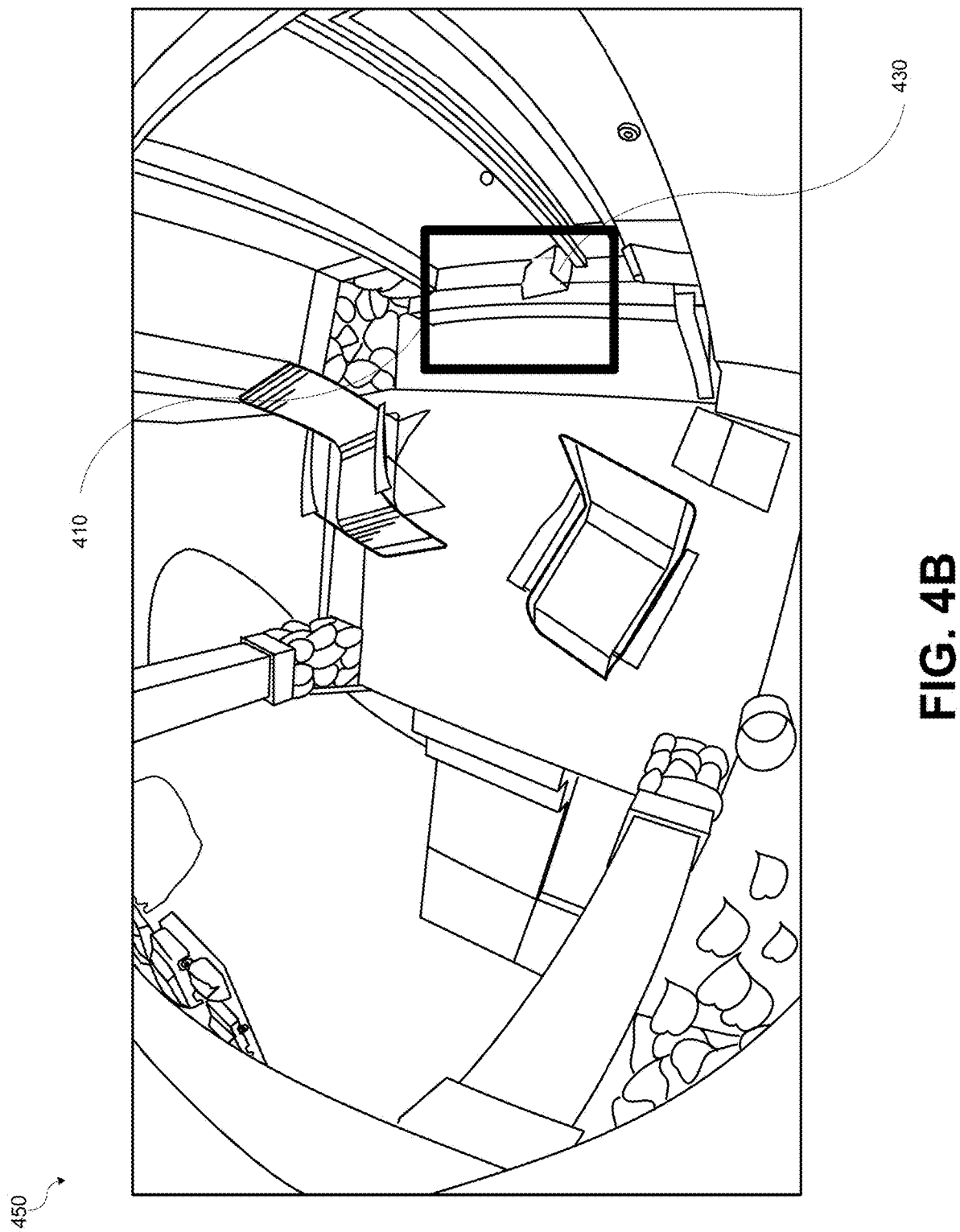
FIG. 4B is an illustration of a zone in a scene after motion was detected in accordance with various aspects of the present disclosure.

FIG. 4B is an illustration of a zone in a scene 450 after motion was detected in accordance with various aspects of the present disclosure. As can be seen in FIG. 4B, the package 430 remains in the defined zone 410 after the detected motion has ended. FIG. 4B may represent post-roll static video frames captured by the video camera 110 after the detected motion ended, while FIG. 3 may represent the pre-roll static video frames captured by the video camera 110 before the detected motion started. The static analysis may determine a difference in composition (e.g., the package 430) between the pre-roll static video frames of FIG. 3 and the post-roll static video frames of FIG. 4B.

Based on the motion analysis and the static analysis of the pre-roll static video frames and the post-roll static video frames captured by the video camera 110, the computer 120 and/or the processor 112 of the video camera 110 may determine that an object, for example the package 430, was left within the defined zone 410 after the motion was detected. In the present example, the defined zone is outside of a building, but in other cases the defined zone may be inside a building. In some cases, when a package is delivered or added to an defined zone, the video camera system 100, for example the computer 120 and/or the processor 112 of the video camera 110 may correlate the delivery with a third-party application to match the actual delivery date with the expected delivery date. In other cases, the delivery date may be correlated to a calendar of a user to determine that a delivery was expected or that the delivery is an unexpected delivery. In some embodiments, the video camera system 100 may perform additional static analysis on the object to determine additional characteristics, for example, but not limited to, the color of the object, whether the object includes a bar code, etc. One of ordinary skill in the art will appreciate that the characteristics may be determined without departing from the scope of the present disclosure.

In some implementations, various characteristics of the person may be detected. For example, the color of a person's clothing and/or the path of the person walking towards the defined zone may identify a particular delivery company as the party leaving an object. In some cases, the identity of a person removing an object may be detected. In other cases, the color and/or size of an object, or a barcode if present, may be identified. The various detected characteristics may be used in making an identification of the object.

In accordance with various aspects of the present disclosure, after an object is detected in a defined zone, the computer 120 and/or the processor 112 of the video camera 110 may cause the video camera system 100 to transition to a different state of monitoring. The different state of monitoring may be a "heightened" state of monitoring. In the heightened monitoring state, the video camera system 100 may, for example, provide higher video quality (e.g., high resolution video or other enhanced video quality parameter), activate additional video cameras if available, enable floodlights and/or infrared (IR) lights, store additional frames of video, etc. A higher false alarm rate, for example, alarms or notifications generated by the video camera system 100 caused by a person or pet close to a defined zone, may occur but may be acceptable. In addition, after a period of time the video camera system 100 may generate reminders that an object has been added to the defined zone (e.g., a package has been delivered) and should be retrieved.

When the video camera system 100 detects that an object has been added or removed from a defined zone, a notification to the user may be generated. Various notification methods, for example but not limited to, messages displayed on the user interface 150 or a wearable device, a text or other alert on a mobile communication device, sending a snapshot of an image, etc., registering the event in a timeline, providing audio cues via, for example but not limited to, Amazon Echo, Siri, etc., or other actions, may be provided to notify the user that the video camera system 100 has detected an added or removed object. One of ordinary skill in the art will appreciate that other notification methods may be used without departing from the scope of the present disclosure.

When the video camera system 100 detects that an object (e.g., a package) has been removed from a defined zone, the video camera system 100 may perform additional functions or actions. In some cases, the computer 120 and/or the processor 112 of the video camera 110 may execute a facial recognition algorithm on the pre-roll static video frames and the post-roll static video frames or any other video frames captured by the video camera 110 to identify whether the person removing the object is a known person, for example a person authorized to remove the object, or an unknown person, for example a person not authorized to remove the object.

In addition, the computer 120 and/or the processor 112 of the video camera 110 may analyze the pre-roll static video frames and the post-roll static video frames as well as the motion video from all frames in which motion is detected to understand a direction in which an object is removed from an identified zone. For example, when the analysis indicates that the object is removed from the defined zone in a direction leading into a building, the computer 120 and/or the processor 112 of the video camera 110 may determine that an authorized person removed the object. Conversely, when the analysis indicates that the object is removed from the defined zone in a direction leading away from a building, the computer 120 and/or the processor 112 of the video camera 110 may determine that an unauthorized person removed the object, for example the object is being stolen. Based on the determination, the computer may generate an appropriate notification. Information obtained from the motion analysis may be used in the determination as well as the decision to generate a notification.

In cases where the analysis indicates that removal of the object from the defined zone is unauthorized, the computer 120 and/or the processor 112 of the video camera 110 may cause the video camera system 100 to perform other actions.

For example, the computer 120 and/or the processor 112 of the video camera 110 may cause the video camera system 100 to sound an alarm, turn on lights, send a notification indicated as high priority to the user, etc. One of ordinary skill in the art will appreciate that this is not an exhaustive list of actions that may be performed by the video camera system 100 and that other actions may be taken without departing from the scope of the present disclosure.

Figure 5:
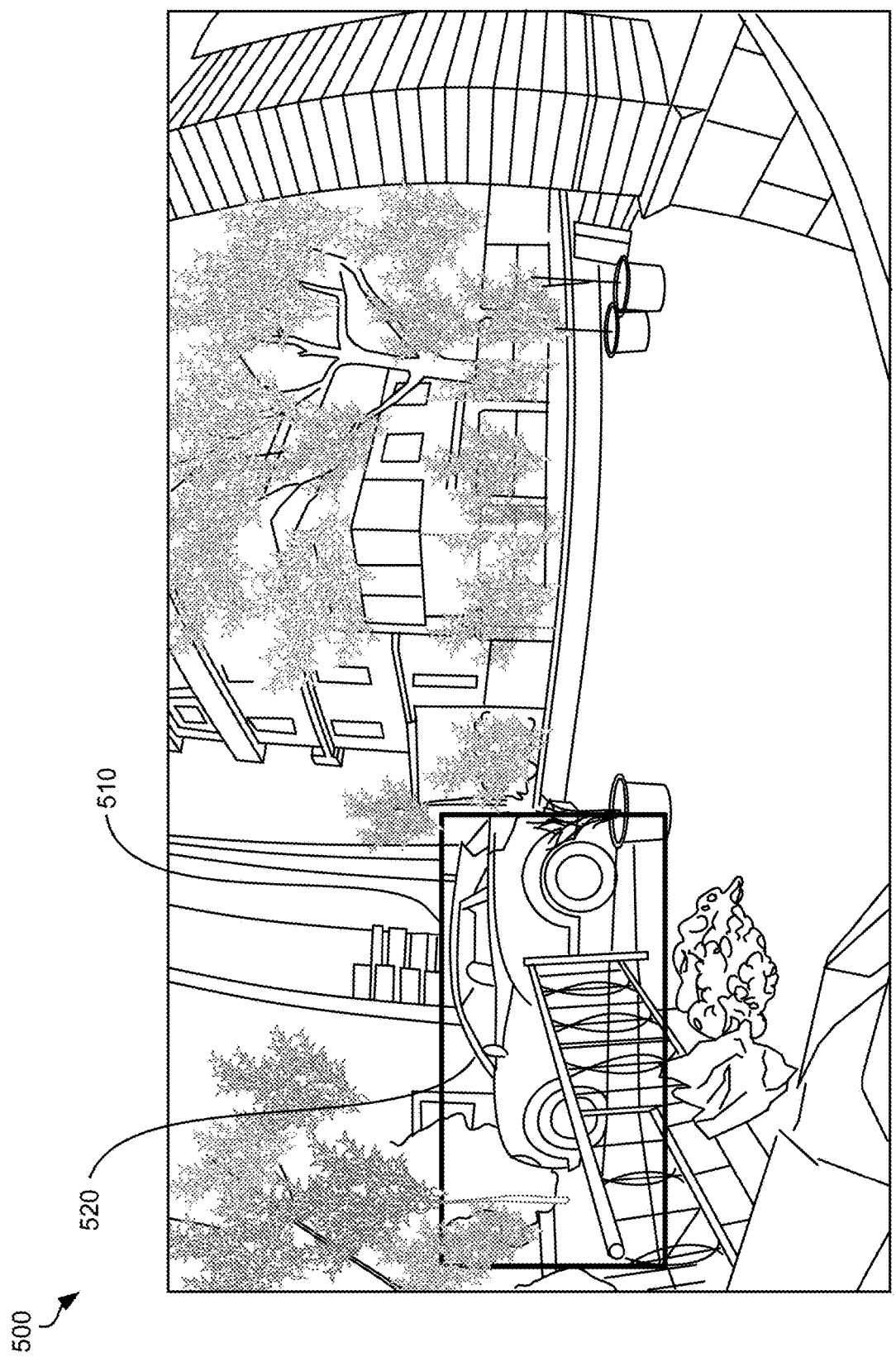
FIG. 5 is an illustration representing a scene including a car monitored by a video camera in accordance with various aspects of the present disclosure.

In some embodiments, the video camera system 100 may detect whether a car is parked in a defined zone. FIG. 5 is an illustration representing a scene including a car monitored by a video camera in accordance with various aspects of the present disclosure. Referring to FIG. 5, the scene 500 monitored by the video camera 110 includes a defined zone 510 in which a car 520 may be parked. The defined zone 510 may be a computer defined zone or a user defined zone. For example, a user may operate the input device 140 of the video camera system 100 to define the zone 510 on the user interface 150 within the scene displayed on the display device 130. Alternatively, the computer 120 and/or the processor 112 of the video camera 110 may perform static analysis and/or motion analysis of the scene and, based on the analysis, generate a defined zone in which a car is likely to be present. The defined zone 510 may be a parking zone for a vehicle.

In accordance with various aspects of the present disclosure, detected motion in the monitored scene 500 that overlaps with at least a portion of the defined zone 510 may initiate static analysis of the pre-roll static video frames and the post-roll static video frames at the beginning and the end, respectively, of the captured motion video. For example, the motion of a car 520 entering the defined zone 510 and parking or the car 520 leaving the defined zone 510 after being parked there may be detected motion that initiates the static analysis of the pre-roll static video frames and the post-roll static video frames. However, in some embodiments, a car passing through the defined zone 510 without pausing within the defined zone 510 may not initiate the static analysis.

The static analysis may be performed to detect that a car 520 was arrived or departed from the defined zone 510 after the motion was detected in the defined zone 510. In some implementations, car detection, rather than person detection, may be performed for the defined zone 510 to detect additional details of the car, for example, but not limited to, license plate recognition, color of the car, business logo identification, etc. Car detection may be an performed by an algorithm operating on the computer 120 and/or the processor 112 of the video camera 110. In other implementations, person detection may be performed in addition to car detection to identify that a person approached or walked away from the car. Person detection may be an performed by an algorithm operating on the computer 120 and/or the processor 112 of the video camera 110. In some implementations, when a person is detected facial recognition may be performed to identify the person.

In some implementations, an alarm or notification may be generated when the system detects that a car arrived in or departed from a defined zone. The alarm or notification may be, for example but not limited to, a notification via the user interface 150 or a wearable device, a text or other alert on a mobile communication device, sending a snapshot of an image, etc., registering the event in a timeline, providing audio cues via, for example but not limited to, Amazon Echo, Siri, etc., or another action.

In accordance with aspects of the present disclosure, when motion is detected in the monitored scene the computer 120 and/or the processor 112 of the video camera 110 may track the moving entity (e.g., the tracked entity) and may identify the tracked entity. For example, the computer 120 may classify the tracked entity as, for example, but not limited to, a car, a person, a dog, a cat, etc. Classification may be performed with, for example, a classifier trained with relevant data to identify a class of the tracked entity (e.g., person, pet, car, etc.) creating the motion in or near the defined zone. In some embodiments, when classification determines that the tracked entity is a person, the computer 120 and/or the processor 112 of the video camera 110 may perform facial recognition to determine whether the person is a known person or an unknown person.

In some cases, additional characteristics of the tracked entity may be determined. The additional characteristics may be the color and/or size of the tracked entity, for example, a delivery person in a recognizable colored identifying the delivery company, a child, an orange cat, etc. One of ordinary skill in the art will appreciate that this is not an exhaustive list of classifications and characteristics that may be determined by the video camera system 100 and that other classifications and characteristics may be determined without departing from the scope of the present disclosure. The classifications and additional characteristics may minimize false indications of package delivery. For example, when motion detected in the scene is classified as a cat or other animal, the computer 120 and/or the processor 112 of the video camera 110 may not initiate static analysis of the pre-roll static video frames and the post-roll static video frames.

In addition, the motion video from any frames in which motion is detected may be analyzed to determine how the tracked entity is moving. The manner or path of movement of a tracked entity may provide an indication of whether an object was added or removed from a defined zone as well as the nature of the object. For example, the computer 120 and/or the processor 112 of the video camera 110 may determine whether the tracked entity is moving towards or away from a defined zone, whether the tracked entity is partially inside the defined zone, or whether the tracked entity is completely inside the defined zone. In some cases, a person walking towards a defined zone, pausing in or near the defined zone, and then walking away from the defined zone may be an indication that object was added or removed from the zone. In some embodiments, detected motion of this type may initiate the static analysis.

Based on the identification or classification of the tracked entity, the static analysis, and the motion analysis, the computer 120 and/or the processor 112 of the video camera 110 may synthesize rules to determine whether an object was added or removed from a defined zone. For example, the video camera system 100 may determine that an object has been added or removed from a defined zone when motion is detected in or near the defined zone, the motion is created by a person, and a static analysis of pre-roll static video frames and the post-roll static video frames indicates a change in the composition of the defined zone between the static video frames.

For example, the computer 120 and/or the processor 112 of the video camera 110 may synthesize a rule such that if a difference in the composition of the defined zone is detected between the pre-roll static video frames and the post-roll static video frames, and the tracked entity that at least partially overlaps a defined zone is classified as a person, then an object was added (or removed depending on the static difference) to the defined zone. However, not all motion/static changes may indicate addition or removal of an object from the defined zone. For example, pets or other animals may create motion in the scene and may cause the video camera system 100 to detect a static change in the composition of the defined zone between the pre-roll static video frames and the post-roll static video frames when the animal stays in the defined zone. Another example of synthesized rule may be if a difference in the composition of the defined zone is detected between the pre-roll static video frames and the post-roll static video frames, and the tracked entity that at least partially overlaps a defined zone is classified as a pet, then an object was not added (e.g., the pet may be sitting in the defined zone).

In some implementations, rules may be generated for the case of a monitored parking area for a car. For example, when motion is detected entering the defined zone but not leaving the defined zone, and a difference in the composition of the defined zone is detected between the pre-roll static video frames and the post-roll static video frames, then a car is parked in the defined zone and a notification may be generated. Another rule may be when motion is detected leaving the defined zone but not entering the defined zone, and a difference in the composition of the defined zone is detected between the pre-roll static video frames and the post-roll static video frames, then a car departed the defined zone and a notification may be generated. In cases where motion is detected entering and leaving the defined zone without pausing within the defined zone, static analysis may not be initiated.

One of ordinary skill in the art will appreciate that other rules may be formulated based on detected motion and static differences in the composition of the defined zone detected between the pre-roll static video frames and the post-roll static video frames without departing from the scope of the present disclosure. In some embodiments, when the tracked entity is classified or identified as other than a person, static analysis of the pre-roll static video frames and the post-roll static video frames may not be initiated ty the video camera system 100.

While the above examples are explained in terms of one defined zone in a scene, this is for clarity and ease of explanation. Embodiments in accordance with the present disclosure are not limited to this implementation. One of ordinary skill in the art will appreciate that more and/or different zones may be defined without departing from the scope of the present disclosure.

Figure 6:
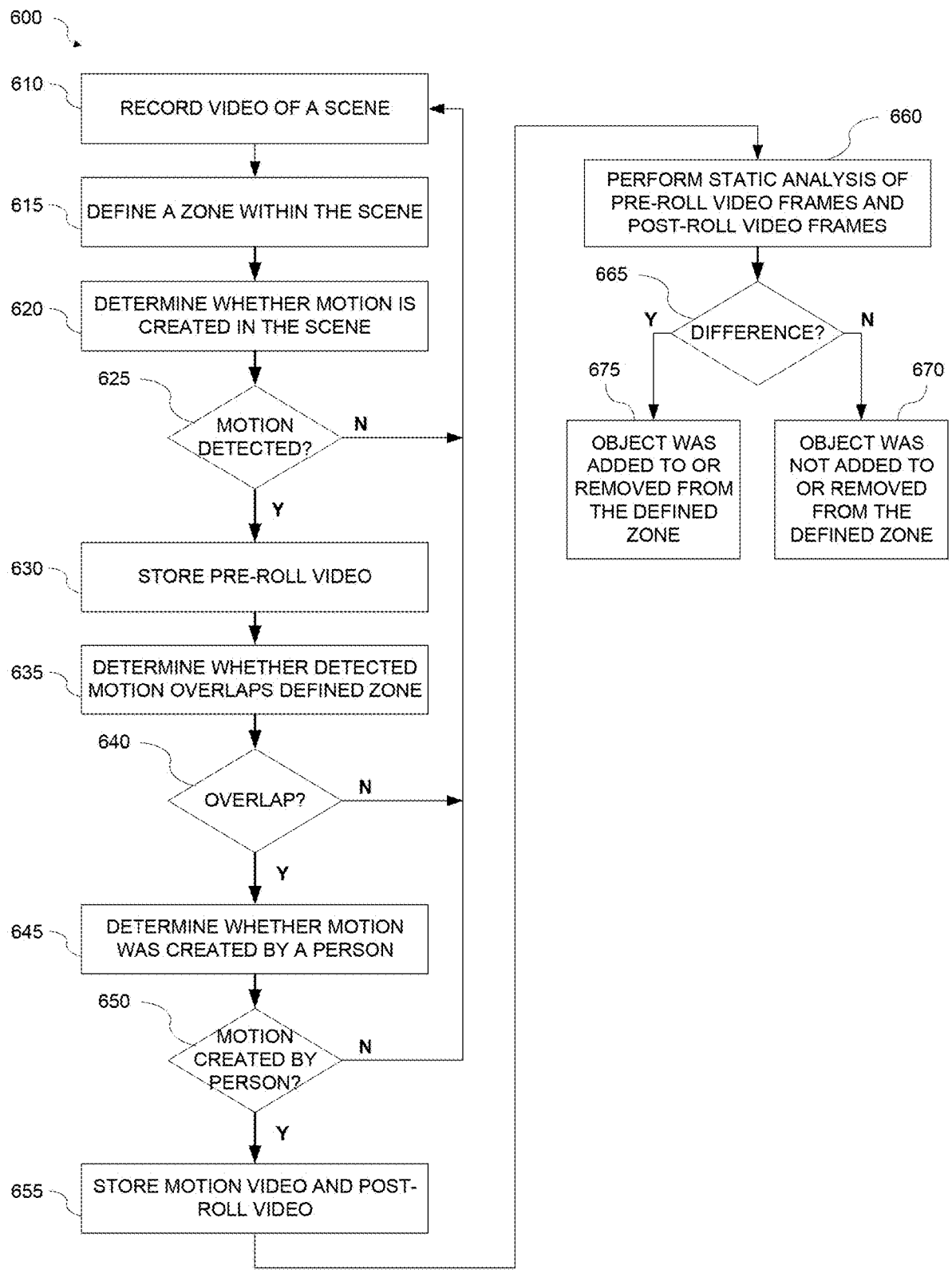
FIG. 6 is a flowchart illustrating an example of a method for detecting objects added or removed within defined regions of a scene in accordance with various aspects of the present disclosure.

FIG. 6 is a flowchart illustrating an example of a method 600 for detecting objects added or removed within defined regions of a scene in accordance with various aspects of the present disclosure. Referring to FIG. 6, at block 610, a zone may be defined within a scene monitored by the video camera system 100. The defined zone may be a user defined zone or a computer defined zones. For example, a user may operate the input device 140 to define a zone on the user interface 150 within a scene displayed on the display device 130. The processor 112 of the video camera 110 may receive the information of the defined zone.

At block 615, video of the scene may be recorded. The video camera 110 may be set to record video of the scene selected by a user. The scene may be, for example, an entry way of a building such as a house or place of business including portions of the area surrounding the entry way. The video camera system 100 may buffer (e.g., temporarily store) the recorded video (e.g., pre-roll video), for example, in the internal electronic media storage device 114

At block 620, the video camera system 100 may determine whether motion is created in the scene being monitored. For example, a sensor (e.g., an infrared sensor or other sensor) in the video camera 110 may detect motion in the monitored scene. In some embodiments, movement may be detected by various devices or sensors configured to detect motion. The computer 120 and/or the processor 112 of the video camera 110 may be coupled to the one or more devices or sensors, for example but not limited to, an ultrasonic rangefinder/imager, an infrared (IR) detector, a trip laser, etc., and receive motion detection signals from the one or more devices or sensors.

At block 625, in response to determining that motion has not been created (625-N), the method may continue to monitor the scene and record video at the operation at block 615. In response to determining that motion has been created (625-Y), at block 630 the computer 120 and/or the processor 112 of the video camera 110 may cause the buffered pre-roll video to be stored, for example in the storage device 160 or the internal electronic media storage device 114. The video camera system 100 may continue to record and buffer motion video as long as the motion persists and for a specified period of time thereafter (e.g., the post-roll video). The recorded motion video may be timestamped or otherwise indicated, for example by the computer 120 and/or the processor 112 of the video camera 110, to enable identification of a time period during which motion is detected in the scene.

At block 635, the detected motion in the scene may be analyzed to determine whether it at least partially overlaps with the defined zone. The computer 120 and/or the processor 112 of the video camera 110 may use motion estimation techniques, for example, but not limited to, foreground differentiation, optical flow, etc., to analyze motion detected within the monitored scene to determine whether the detected motion overlaps with at least a portion of the defined zone. For example, the computer 120 and/or the processor 112 of the video camera 110 may determine whether a number of pixels associates with the tracked entity overlaps a boundary of the defined zone.

At block 640, in response to determining that the detected motion does not at least partially overlap with the defined zone (640-N), the method may continue to monitor the scene and record video at the operation at block 615. In response to determining that the detected motion at least partially overlaps with the defined zone (640-Y), at block 645, it may be determined whether the motion was created by a person. The computer 120 and/or the processor 112 of the video camera 110 may cause person detection to be performed on motion regions that overlap with defined zones.

Person detection may be performed by an algorithm operating on the computer 120 and/or the processor 112 of the video camera 110. Person detection may also detect a person moving towards the defined zone, a person in a vicinity of the defined zone, and/or a person moving away from the defined zone. In some embodiments, the computer 120 and/or the processor 112 of the video camera 110 may track the entity causing the motion (e.g., the tracked entity) and may identify the tracked entity. The computer 120 and/or the processor 112 of the video camera 110 may classify the tracked entity as, for example, but not limited to, a car, a person, a dog, a cat, etc. Classification may be performed with, for example, a classifier trained with relevant data to identify a class of the tracked entity (e.g., person, pet, car, etc.) creating the motion in or near the defined zone. In some embodiments, when classification determines that the tracked entity is a person, the computer 120 and/or the processor 112 of the video camera 110 may perform facial recognition to determine whether the person is a known person or an unknown person.

In response to determining that the motion was not created by a person (650-N), the method may continue to monitor the scene and record video at the operation at block 615. In response to determining that the motion was created by a person (650-Y), at block 655 the video camera system 100 may store the motion video recorded for the period of time that the detected motion persists and video recorded for a specified period of time after the detected motion ends (e.g., the post-roll video). For example, the computer 120 and/or the processor 112 of the video camera may cause the buffered motion video and post-role video to be stored in the storage device 160 or the internal electronic media storage device 114.

At block 660, static analysis of the pre-roll static video frames and the post-roll static video frames may be performed. The computer 120 and/or the processor 112 of the video camera 110 may select one or a plurality of static video frames from the pre-roll static video frames and the post-roll static video frames and may compare raw pixel values or other descriptors, for example, but not limited to, edges, histograms of gradients, etc. One of ordinary skill in the art will appreciate that other descriptors and/or features describing the composition of the zones may be used without departing from the scope of the present disclosure. Based on the results of the static analysis, the computer 120 and/or the processor 112 of the video camera 110 may determine whether a difference between of the composition of the pre-roll static video frames and the composition of the post-roll static video frames exists.

In response to determining that a difference does not exist between the composition of the pre-roll static video frames and the post-roll static video frames (665-N), at block 670 it may be determined that an object was not added or removed from the defined zone. In response to determining that a difference does exist between the composition of the pre-roll static video frames and the post-roll static video frames (665-Y), at block 675 it may be determined that an object was added or removed from the defined zone. For example, when the static analysis is performed to compare the pre-roll static video frames and the post-roll static video frames, detection that an object has been added may be achieved at least in part based on a dissimilarity between changed pixels in an area of the defined zone 310 of a static frame and surrounding pixels of the area. Conversely, a similarity between changed pixels an area of a static frame and surrounding pixels of the area may detect that an object has been removed. Based on the results of the static analysis and information obtained from the motion analysis, the computer 120 and/or the processor 112 may make a determination of the nature of the object added to or removed from the defined zone 310.

It should be appreciated that the specific steps illustrated in FIG. 6 provide a particular method for detecting objects added or removed within defined regions of a scene according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
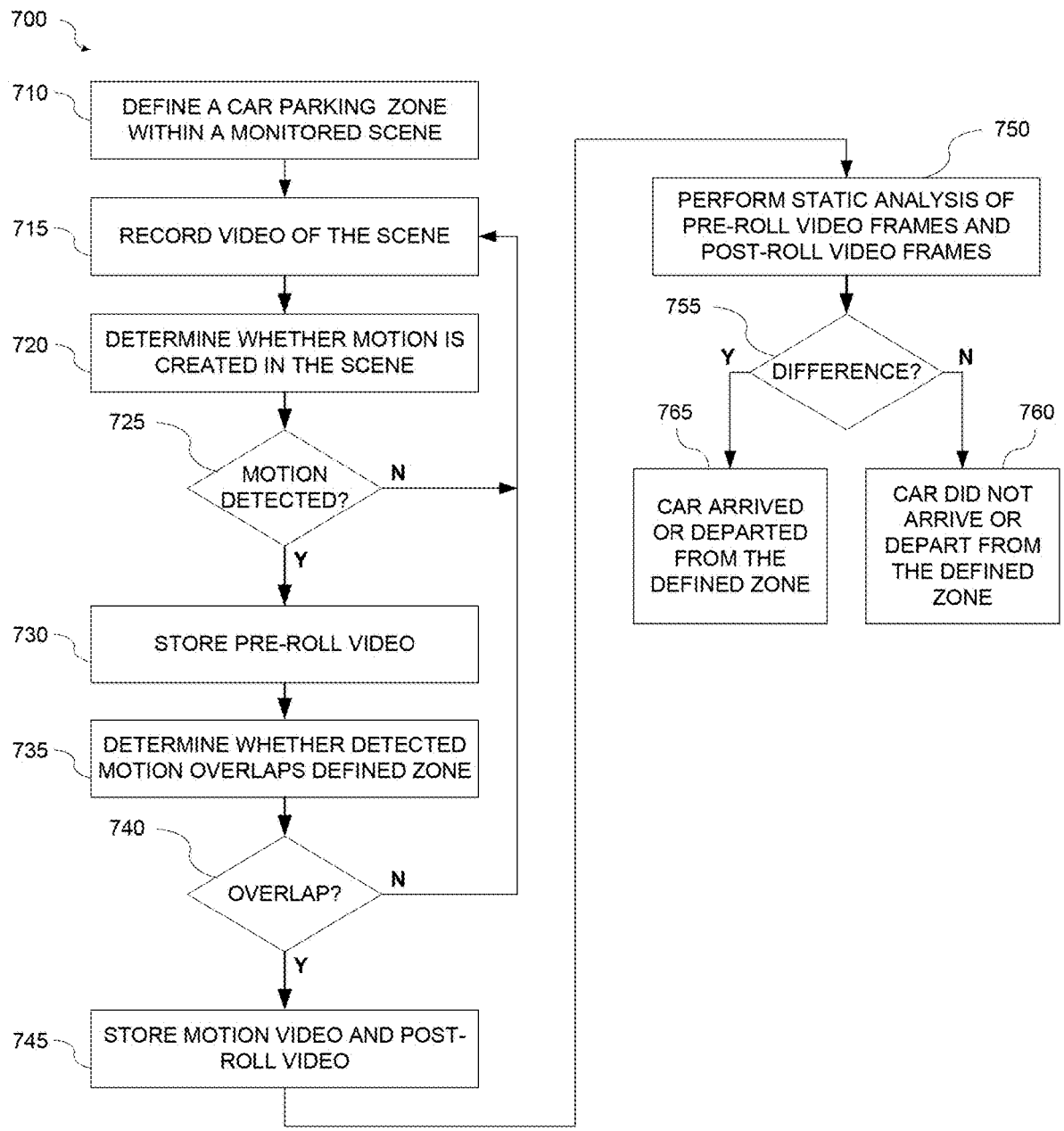
FIG. 7 is a flowchart illustrating an example of a method for detecting a car arriving or leaving a defined region of a scene in accordance with various aspects of the present disclosure

FIG. 7 is a flowchart illustrating an example of a method 700 for detecting a car arriving or leaving a defined region of a scene in accordance with various aspects of the present disclosure. Referring to FIG. 7, at block 710, a zone in which a car can be parked may be defined within a scene monitored by the video camera system 100. The defined zone may be a user defined zone or a computer defined zones. For example, a user may operate the input device 140 to define a zone on the user interface 150 within a scene displayed on the display device 130. The defined zone may be large enough to enclose all or a substantial portion of a car occupying the defined zone. The processor 112 of the video camera 110 may receive the information of the defined zone.

At block 715, video of the scene may be recorded. The video camera 110 may be set to record video of the scene selected by a user. The scene may be, for example, a driveway or other are where a vehicle may be parked. The video camera system 100 may buffer (e.g., temporarily store) the recorded video (e.g., pre-roll video), for example in the internal electronic media device 114. At block 720, the video camera system 100 may determine whether motion is created in the scene being monitored. For example, a sensor (e.g., an infrared sensor or other sensor) in the video camera 110 may detect motion in the monitored scene.

At block 725, in response to determining that motion has not been created (725-N), the method may continue to monitor the scene and record video at the operation at block 715. In response to determining that motion has been created (725-Y), at block 730 the computer 120 and/or the processor 112 of the video camera 110 may cause the buffered pre-roll video to be stored, for example in the storage device 160 or in the internal electronic media storage device 114. The video camera system 100 may continue to record and buffer motion video as long as the motion persists and for a specified period of time thereafter (e.g., the post-roll video). The recorded motion video may be timestamped or otherwise indicated, for example by the computer 120 and/or the processor 112 of the video camera 110, to enable identification of a time period during which motion is detected in the scene.

At block 735, the detected motion in the scene may be analyzed to determine whether it at least partially overlaps with the defined zone. The computer 120 and/or the processor 112 of the video camera 110 may use motion estimation techniques, for example, but not limited to, foreground differentiation, optical flow, etc., to analyze motion detected within the monitored scene to determine whether the detected motion overlaps with at least a portion of the defined zone. For example, the computer 120 and/or the processor 112 of the video camera 110 may determine whether a number of pixels associates with the tracked entity overlaps a boundary of the defined zone.

At block 740, in response to determining that the detected motion does not at least partially overlap with the defined zone (740-N), the method may continue to monitor the scene and record video at the operation at block 715. In response to determining that the detected motion at least partially overlaps with the defined zone (740-Y), at block 745 the video camera system 100 may store the motion video recorded for the period of time that the detected motion persists and video recorded for a specified period of time after the detected motion ends (e.g., the post-roll video). For example, the computer 120 and/or the processor 112 of the video camera 110 may cause the buffered motion video and post-role video to be stored in the storage device 160.

At block 750, static analysis of the pre-roll static video frames and the post-roll static video frames may be performed. The computer 120 and/or the processor 112 of the video camera 110 may select one or a plurality of static video frames from the pre-roll static video frames and the post-roll static video frames and may compare raw pixel values or other descriptors, for example, but not limited to, edges, histograms of gradients, etc. One of ordinary skill in the art will appreciate that other descriptors and/or features describing the composition of the zones may be used without departing from the scope of the present disclosure. Based on the results of the static analysis, the computer 120 and/or the processor 112 of the video camera 110 may determine whether a difference between of the composition of the pre-roll static video frames and the composition of the post-roll static video frames exists. In some embodiments, the motion of a car entering the defined zone and parking or the car leaving the defined zone after being parked there may be detected motion that initiates the static analysis of the pre-roll static video frames and the post-roll static video frames. In some embodiments, a car passing through the defined zone without pausing within the defined zone may not initiate the static analysis.

In response to determining that a difference does not exist between the composition of the pre-roll static video frames and the post-roll static video frames (755-N), at block 760 it may be determined that a car did not arrive or depart from the defined zone and the method may continue to monitor the scene and record video at the operation at block 715. In response to determining that a difference does exist between the composition of the pre-roll static video frames and the post-roll static video frames (755-Y), at block 765 it may be determined that car did arrive or depart from the defined zone. For example, when the static analysis is performed to compare the pre-roll static video frames and the post-roll static video frames, detection that an object has been added may be achieved at least in part based on a dissimilarity between changed pixels in an area of the defined zone of a static frame and surrounding pixels of the area. Conversely, a similarity between changed pixels an area of a static frame and surrounding pixels of the area may detect that an object has been removed. Although flowchart 700 presents a binary decision (e.g. a car is present or not present), it should be noted that some embodiments may perform further analysis with additional outcomes. For instance, a car may still be present, but may have moved. Multiple people may have interacted with the car. One of ordinary skill in the art with the benefit of this disclosure would appreciate the many modifications, variations, and alternative embodiments thereof.

In some embodiments, car detection may be performed for the defined zone to detect additional details of the car, for example, but not limited to, license plate recognition, color of the car, business logo identification, etc. Car detection may be an performed by an algorithm operating on the computer 120 and/or the processor 112 of the video camera 110.

While the method of FIG. 7 has been explained using a car, one of ordinary skill in the art will appreciate that this is merely exemplary for ease of explanation and that the method may be applied to any vehicle without departing from the scope of the present disclosure.

It should be appreciated that the specific steps illustrated in FIG. 7 provide a particular method for a car arriving or leaving a defined region of a scene according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
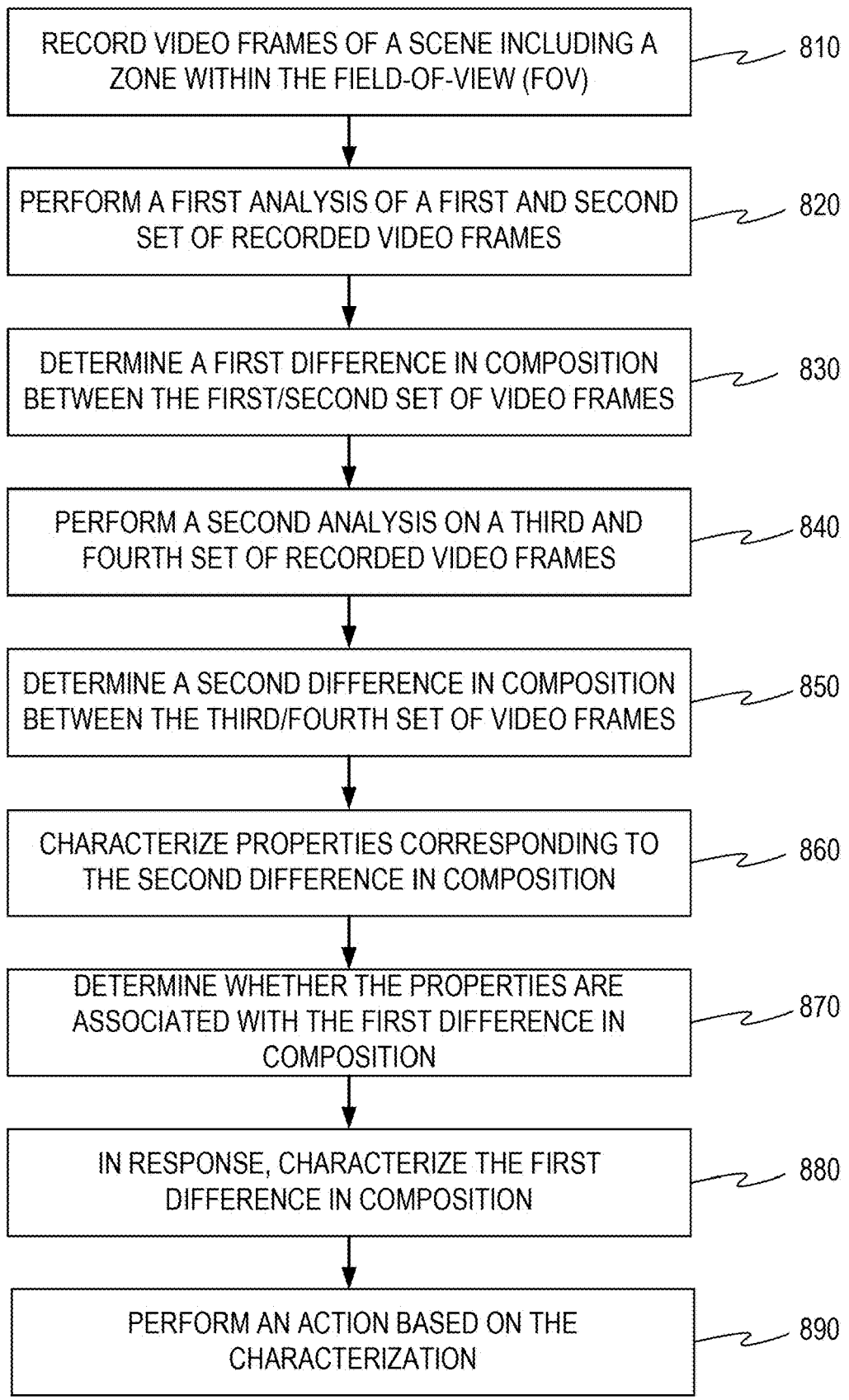
FIG. 8 is a simplified flow chart showing aspects of a method for operating a video camera system in accordance with various aspects of the present disclosure.

FIG. 8 is a simplified flow chart showing aspects of a method 800 for operating a video camera system, according to certain embodiments. Method 800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by one or more processors disposed in a video camera device (e.g., processor(s) 112), one or more processors of a host computing device (e.g., processor(s) 210) locally connected (e.g., hardwired and/or wirelessly coupled over a local area network) or remotely connected (e.g., via a cloud-based service), or a combination thereof.

At operation 810, method 800 can include recording, using a video capture element (e.g., 116) and an electronic media storage device (e.g., 114, 160) controlled by one or more processors (e.g., 112, 210), video frames of a scene (e.g., scenes 300, 400, 450, 500, or the like) captured by the video capture element, according to certain embodiments. In some aspects, the scene can include a zone (e.g., 410) defined as an area within a field-of-view (FOV) of the video capture element. Although many of the examples presented herein include an area near and around a front door of a residence, in a particular room (e.g., in and around a baby crib), a particular sensitive area (e.g., around a safe or restricted area), etc., such that any suitable scene (e.g., residential, commercial, industrial, rural, urban, populous areas, uninhabited areas, etc.) of any FOV (e.g., 90°, 120°, 180°, 360°, etc.) can be used, and the zone may be of any suitable size, dimension, or there may be multiple connected or unconnected zones, as would be appreciated by one of ordinary skill in the art with the benefit of this disclosure.

At operation 820, method 800 can include performing, by the one or more processors, a first analysis of a first set of the recorded video frames showing the zone over a first period of time and a second set of the recorded video frames showing the zone over a second period of time, according to certain embodiments. The first set and/or the second set of video frames can each include a single video frame (e.g., having a first period of time being a single moment in time or substantially zero seconds) or a plurality of continuous (successive) or discontinuous (not successive) frames that can span any suitable period of time (e.g., 10 ms, 100 ms, 1 s, 5 s, etc.), as would be appreciated by one of ordinary skill in the art with the benefit of this disclosure.

At operation 830, method 800 can include determining by the one or more processors, based on the first analysis, a first difference of composition between the first set of video frames and the second set of video frames within the zone, according to certain embodiments. For instance, the difference in composition between the first and second sets of video frames in the first analysis may correspond to a detected object (e.g., package, person, animal, etc.) being present in the first set of video frames and the detected object not being present in the second set of video frames. In the case of a package (which may be identified or "characterized" based on properties such as its size, shape, color, or other properties using image analysis), for instance, the package might appear inside the zone in first set of video frames (e.g., in the zone) but may not appear in the zone (or anywhere else in the FOV) in the second set of video frames, which may indicate that the package was removed. In the converse, the second set of video frames may include a package but not the first set, which may indicate that the package was dropped off. In some aspects, the difference in composition between the first and second sets of video frames may correspond to a change in the content of pixels defining the first and second sets of video frames. More specifically, a change in composition may be determined as changes in raw pixel values of the frames, different statistics of pixels over some or all of the frames, different edges or other descriptors, for example, but not limited to, edges, histograms of gradients, image segmentation, or other image features related to the frames, etc., as described above. One of ordinary skill in the art will appreciate that other methods of determining a change in composition of the first and second sets of video frames may be used without departing from the scope of the present disclosure. In some aspects, the first analysis can be a static analysis of the first and second sets of video frames. A static analysis may correspond to analyzing differences between the sets of video frames as capture moments in time with the first set of video frames corresponding to a first moment (or moments) in time and the second set of video frames corresponding to a second moment (or moments) in time, which is typically associated with looking for additions or subtractions of object within a scene. This can be contrasted with a motion analysis which can typically span multiple frames, typically in succession, to see how an object moves within the scene, as further described below.

At operation 840, method 800 can include performing, by the one or more processors, a second analysis of a third set of the recorded video frames showing an area outside of the zone over a third period of time, and a fourth set of the recorded video frames showing the area outside of the zone over a fourth period of time, according to certain embodiments. In some implementations, the second analysis of the third set and fourth set of the recorded video frames can be performed in response to determining that there is a difference in composition between the first set of video frames and the second set of video frames within the zone. In some aspects, the second analysis can be a motion-based analysis of the object detected in the third set of video frames. In some cases, the third and fourth sets of video frames may include the same set of video frames, or may include some of the same video frames. For example, the video frames may be a continuous or discontinuous set of video frames capturing images before, during, and/or after the period(s) of time captures by the first and second sets of video frames.

To illustrate, a system may track activity within a particular zone, which may be tracked with the first and second sets of video frames. When a difference of composition is detected (e.g., an object detected within the zone in the second set of video frames does not appear to exist in the first set of video frames), the system may contextually evaluate the difference in the zone by analyzing what is occurring outside of the zone. For example, relevant inquiries may include whether the detected difference in composition corresponds to a package being dropped off (which may trigger an alert to a user), or whether the detected differences was due to a transient activity, such as an animal passing through the zone or other activity that may not be warrant alerting a user. By analyzing video content around the zone (e.g., via motion-based analysis), the detected difference may be contextualized. In the case of the package being dropped off, video in the third and/or fourth set of video frames may include a mail carrier entering and leaving the zone during the same period of time that the object is detected. Or perhaps a neighborhood animal may have simply passed through, which can be further corroborated if a subsequent set of video frames directed to the zone show the object no longer present. In such arrangements, activity in the zone may cause the system to initiate an analysis of activity outside of the zone to contextualize said activity in the zone. In some aspects, activity detected outside of the zone (the third and fourth sets of video frames) may cause the system to initiate an analysis of activity inside the zone to contextualize said activity outside the zone. For example, an unknown vehicle may be detected outside of the zone (e.g., in front of a user's home) and an analysis of activity within the zone may help determine whether the occupant of the vehicle came to the user's home. Static or motion-based detection may be used for in-zone or out-of-zone analysis. These concepts are further described in operations 850-890 and with respect to FIGS. 1-7 above.

At operation 850, method 800 can include determining by the one or more processors, based on the second analysis, a second difference of composition between the third set of video frames and the fourth set of video frames, according to certain embodiments. The determination may be via a static or motion-based analysis. As described above, the third and fourth sets of video frames may include the same video frames, some video frames common to the third and fourth sets, or each may include different video frames.

At operation 860, method 800 can include characterizing, by the one or more processors, one or more properties corresponding to the second difference in composition outside of the zone, according to certain embodiments. In some aspects, the second difference in composition may correspond to one or more detected objects outside the zone. The one or more properties of the object(s) may, for instance, include a size, shape, color, or location of an object. The properties may correspond to how the object moves (movement traits), which may include the objects gait (for a human or animal), the objects detected speed, acceleration, or path of movement. In some cases, properties can include a classification of the object. For instance, image processing may determine that the object is a box/package, a person, a vehicle, etc., as further described above. The properties may include alphanumeric text and/or symbols disposed on or associated with the detected object. One of ordinary skill in the art with the benefit of this disclosure would appreciate the myriad ways to characterize a detected object via image processing techniques, as discussed for example in U.S. patent application Ser. No. 15/992,234 that has been incorporated by reference as noted above.

At operation 870, method 800 can include determining, by the one or more processors, whether the one or more properties of the second difference in composition is associated with the first difference in composition within the zone, according to certain embodiments. In the case of a motion-based analysis, method 800 can include detecting a motion of an object within the third and/or fourth sets of recorded video frames (e.g., outside the zone), where determining whether the one or more properties are associated with the difference in composition between the first set of video frames and the second set of video frames includes determining whether the detected motion of the object includes a movement of the object within the zone.

For example, the first difference in composition may include a detection of a package, and the second difference in composition may correspond to a detected person (the object) moving through the scene toward the zone. The detected person may be characterized as such by the one or more properties including the person's detected size, movement characteristics (e.g., gait, speed, etc.) or the like. The person (second difference in composition) may be determined to be associated with the package in the zone (the first difference in composition) if, for example, the initial detection of the package corresponds to the person entering and/or exiting the zone (or near the zone), such as a courier delivering a package. In the scenario where is detected in the zone and then is no longer detected (the first difference in composition), then a detected person that enters, exists, or is adjacent to the zone at the time that the package is no longer detected may be determined to be associated with the first difference in composition, which may correspond to behavior by an unauthorized individual removing the package. The aforementioned example is just one example that illustrates how a static or motion analysis outside the zone (identifying differences in composition such as one or more detected "first" objects like a person, car, etc.) may be used to characterize activity detected within the zone (differences in composition such as one or more detected "second" objects using static or motion analysis). In some cases, the objects may be one and the same. For example, a person may be detected outside the zone and then inside the zone. By analyzing video outside the zone, other properties from other objects, such as a vehicle (e.g., large mail truck), may help the system determine if the detected person is supposed to be there (e.g., the person is a mail carrier, the person is supposed to arrive at a particular time, etc.), or the person is an unexpected visitor.

Explained another way, the system may detect what appears to be a package in the zone with a certain level of confidence (e.g., 50% likely) and the system can use activity outside of the zone (e.g., a truck and approaching person moving from the truck to the zone) to increase the confidence that the detected package is more likely to, in fact, be a package and the system may alert a user. Put simply, a "cause" of the determine difference in composition of video frames in the zone (e.g., first and second set of video frames) may be further supported by a determined difference of composition of video frames outside the zone (e.g., third and/or fourth sets of video frames). In another example, the system may intermittently detect one or more objects in the zone that appear to move, appear, disappear, etc. To help prevent a false positive identification of an object, video analysis outside the zone may reveal that a thunderstorm is occurring with lightning flashes (e.g., resulting in rapid changes in lighting) and blowing debris (e.g., leaves, trash, objects, etc.). The out-of-zone analysis can help strengthen the determination (increase a confidence level) that the intermittent detection of objects is indeed a series of false positive detections due to inclement weather conditions and the system may determine that no action be taken. Furthering the example, the analysis of the out-of-zone activity may reveal that significant amounts of debris have collected in the user's yard (detected as a difference in composition of current video frame(s) and video frames captured before the storm), which may result in a different type of message sent to a user (e.g., photos/video of the front yard). One of ordinary skill in the art with the benefit of this disclosure would appreciate the many modifications, variations, and alternative applications of using differences of composition (e.g., detected activity, objects, etc.) within the zone and outside of the zone to provide more context to one another.

At operation 880 of method 800, in response to determining that the one or more properties (e.g., a person entering, exiting, or adjacent to the zone) are associated with the first difference in composition within the zone (e.g., a package appearing at or around the time the person is detected entering, exiting, or adjacent to the zone), the one or more processors may be configured to perform characterizing the first difference in composition within the zone (e.g., confirming that a package is dropped off) based on the one more properties and performing an action (e.g., alerting a user) based on said characterization of the first difference in composition within the zone (operation 890), according to certain embodiments. In some embodiments, the action performed can include at least of: alerting a user of the difference in composition between the first and second sets of video frames, sending a corresponding video clip including the difference in composition between the first and second sets of video frames, triggering an alarm, opening or unlocking a door, turning on a remote video camera, triggering a launch of a security drone, initiating an automated message (e.g., a recording saying "thank you for stopping by"), etc. Any action can be triggered and one of ordinary skill in the art with the benefit of this disclosure would appreciate the many possibilities, variations, and alternative types of actions that could be employed.

It should be appreciated that the specific steps illustrated in FIG. 8 provide a particular method 800 for operating a video camera system, according to certain embodiments. Other sequences of operations may also be performed according to alternative embodiments and operations may be added or removed accordingly. For instance, many of the examples provided herein may focus on the use of in-zone and out-of-zone video analysis to increase a confidence level of detected activity in one or the other, as described above. However, some implementations may alternatively or additionally use the aforementioned systems and methods for improved power efficiency. For example, some camera systems may include cameras that are battery operated. Some of the video analysis discussed herein may be computationally expensive and could draw significant power on a local battery in the video camera. Thus, some embodiments may benefit from reduced power consumption by, for example, performing occasional static analyses within the zone and resorting to analysis outside the zone when a difference in composition is first detected within the zone. That way, the system may not be constantly or frequently analyzing video content over the whole scene, and substantial processing (e.g., first and second analysis) may occur only in response to a resulting static analysis indicating a detected change in the zone. In some cases, other ways to reduce power consumption may be used (e.g., including periodic analyses of both in and out-of-zone in the scene). One of ordinary skill in the art with the benefit of this disclosure would appreciate the many modifications, variations, and alternative embodiments thereof.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A video camera system, comprising:
   a video capture element configured to capture video images;
   an electronic media storage device; and
   one or more processors coupled to the video capture element and the electronic media storage device, the one or more processors configured to:
   record, using the electronic media storage device, video frames of a scene captured by the video capture element, wherein the scene includes a zone defined as an area within a field-of-view of the video capture element;
   perform an analysis of the recorded video frames;
   detect activity within the zone based on a difference of composition of the recorded video frames within the zone; and
   in response to detecting activity within the zone, switch the video camera system to a heightened monitoring state characterized in that, while in the heighted monitoring state, the one or more processors cause a resolution of the video frames to be increased and a false alarm rate threshold is changed to a lower threshold setting.

2. The video camera system of claim 1 wherein the activity within the zone corresponds to a detected object within the zone for a first portion of the recorded video frames and the detected object not being detected within the zone for a subsequent second portion of the recorded video frames.

3. The video camera system of claim 1 wherein the heightened monitoring state is further characterized in that, while in the heighted monitoring state, the one or more processors are configured to activate other video capture elements that are communicatively coupled to the video camera system that not currently activated.

4. The video camera system of claim 1 wherein the heightened monitoring state is further characterized in that, while in the heighted monitoring state, the one or more processors are configured to activate floodlights and/or infra-red lights that are communicatively coupled to the video camera system.

5. The video camera system of claim 1 wherein the heightened monitoring state is further characterized in that, while in the heighted monitoring state, other video capture elements that are communicatively coupled to the video camera system and are not currently activated are activated.

6. A computer-implemented method for operating a video camera system, the method comprising:
   recording, using an electronic media storage device configured to store video images, video frames of a scene captured by a video capture element of the video camera system, the scene including a zone defined as an area within a field-of-view of the video capture element;
   performing an analysis of the recorded video frames;
   detecting activity within the zone based on a difference of composition of the recorded video within the zone; and
   in response to the detecting activity within the zone, switching the video camera system to a heightened monitoring state characterized in that, while in the heighted monitoring state, the one or more processors cause a resolution of the video frames to be increased and a false alarm rate threshold is changed to a lower threshold setting.

7. The video camera system of claim 6 wherein the activity within the zone corresponds to a detected object within the zone for a first portion of the recorded video frames and the detected object not being detected within the zone for a subsequent second portion of the recorded video frames.

8. The video camera system of claim 6 wherein the heightened monitoring state is further characterized in that, while in the heighted monitoring state, the one or more processors are configured to activate other video capture elements that are communicatively coupled to the video camera system that not currently activated.

9. The video camera system of claim 6 wherein the heightened monitoring state is further characterized in that, while in the heighted monitoring state, the one or more processors are configured to activate floodlights and/or infra-red lights that are communicatively coupled to the video camera system.

10. The video camera system of claim 6 wherein the heightened monitoring state is further characterized in that, while in the heighted monitoring state, other video capture elements that are communicatively coupled to the video camera system and are not currently activated are activated.

11. A video camera system, comprising:
    a video capture element configured to capture video images;
    an electronic media storage device; and one or more processors coupled to the video capture element and the electronic media storage device, the one or more processors configured to:

record, using the electronic media storage device, video frames of a scene captured by the video capture element, wherein the scene includes a zone defined as an area within a field-of-view of the video capture element;

perform a first analysis of the recorded video frames showing the zone over a period of time;

determine, based on the first analysis, a first difference of composition of the recorded video frames within the zone, the first difference in composition corresponding to a detected object within the zone being present for a first portion of the period of time, and the detected object not being present in the zone for a subsequent second portion of the period of time;

perform a second analysis of the recorded video frames showing an area outside of the zone over the period of time;

determine, based on the second analysis, a second difference of composition of the recorded video frames of the area outside of the zone, the second difference in composition corresponding to a movement of the detected object outside of the zone during at least a portion of the second portion of the period of time;

in response to determining that the detected object outside of the zone is moving in a first direction, perform a first action; and in response to determining that the detected object outside of the zone is moving in a second direction, perform a second action.

12. The video camera system of claim 11 wherein the first direction is a direction toward building adjacent to the zone, and wherein the second direction is a direction away building.

13. The video camera system of claim 12 wherein in response to determining that the detected object outside of the zone is moving in the second direction, the one or more processors are further configured to switch the video camera system to a heightened monitoring state characterized in that, while in the heighted monitoring state, the one or more processors cause a resolution of the video frames to be increased.

14. The video camera system of claim 13 wherein the heightened monitoring state is further characterized in that, while in the heighted monitoring state, the one or more processors are configured to:

activate other video capture elements that are communicatively coupled to the video camera system that not currently activated;

activate floodlights and/or infra-red lights that are communicatively coupled to the video camera system;

activate other video capture elements that are communicatively coupled to the video camera system and are not currently activated; or change a false alarm rate threshold to a lower threshold setting.

15. A computer-implemented method for operating a video camera system, the method comprising:

recording, using an electronic media storage device configured to store video images, video frames of a scene captured by a video capture element of the video camera system, the scene including a zone defined as an area within a field-of-view of the video capture element;

performing a first analysis of the recorded video frames showing the zone over a period of time;

determining, based on the first analysis, a first difference of composition of the recorded video frames within the zone, the first difference in composition corresponding to a detected object within the zone being present for a first portion of the period of time, and the detected object not being present in the zone for a subsequent second portion of the period of time;

performing a second analysis of the recorded video frames showing an area outside of the zone over the period of time;

determining, based on the second analysis, a second difference of composition of the recorded video frames of the area outside of the zone, the second difference in composition corresponding to a movement of the detected object outside of the zone during at least a portion of the second portion of the period of time;

in response to determining that the detected object outside of the zone is moving in a first direction, performing a first action; and in response to determining that the detected object outside of the zone is moving in a second direction, performing a second action.

16. The method of claim 15 wherein the first direction is a direction toward building adjacent to the zone, and wherein the second direction is a direction away building.

17. The method of claim 16 wherein in response to determining that the detected object outside of the zone is moving in the second direction, the method further comprises:

switching the video camera system to a heightened monitoring state characterized in that, while in the heighted monitoring state, a resolution of the video frames is increased.

18. The method of claim 17 wherein the heightened monitoring state is further characterized in that, while in the heighted monitoring state, the method further comprises:

activating other video capture elements that are communicatively coupled to the video camera system that not currently activated;

activating floodlights and/or infra-red lights that are communicatively coupled to the video camera system;

activating other video capture elements that are communicatively coupled to the video camera system and are not currently activated; or changing a false alarm rate threshold to a lower threshold setting.

* * * * *